(12) United States Patent
Early et al.

(10) Patent No.: US 8,412,598 B2
(45) Date of Patent: *Apr. 2, 2013

(54) SYSTEMS AND METHODS FOR A CAUSALITY ANALYZER

(76) Inventors: John Early, Ridgefield, CT (US); Danny Cho-Liang Lai, Belmont, CA (US); Jeffrey D. Johnson, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/024,875

(22) Filed: Feb. 10, 2011

(65) Prior Publication Data

US 2011/0251932 A1    Oct. 13, 2011

Related U.S. Application Data

(63) Continuation-in-part of application No. 12/027,193, filed on Feb. 6, 2008, now Pat. No. 7,904,355.

(51) Int. Cl.
*G07B 17/00* (2006.01)
(52) U.S. Cl. .......................... 705/30; 705/36
(58) Field of Classification Search ................... 705/30, 705/36; 709/223
See application file for complete search history.

(56) References Cited

U.S. PATENT DOCUMENTS

| | | |
|---|---|---|
| 3,806,711 A | 4/1974 | Cousins, Jr. |
| 5,053,957 A | 10/1991 | Suzuki |
| 5,224,034 A | 6/1993 | Katz et al. |
| 5,461,708 A | 10/1995 | Kahn |
| 5,497,489 A | 3/1996 | Menne |
| 5,537,590 A | 7/1996 | Amado |
| 5,590,269 A | 12/1996 | Kruse et al. |
| 5,670,984 A | 9/1997 | Robertson et al. |
| 5,689,287 A | 11/1997 | Mackinlay et al. |
| 5,710,887 A | 1/1998 | Chelliah et al. |
| 5,740,448 A | 4/1998 | Gentry et al. |

(Continued)

FOREIGN PATENT DOCUMENTS

| | | |
|---|---|---|
| WO | WO 99/60486 | 11/1999 |
| WO | WO 00/29995 | 5/2000 |

(Continued)

OTHER PUBLICATIONS

Markusen,Ann, A market for jobs approach for analyzing the competition for capital, National Tax Association, pp. 30-35.*

(Continued)

*Primary Examiner* — Scott Zare
*Assistant Examiner* — Talia Crawley
(74) *Attorney, Agent, or Firm* — Kang S. Lim

(57) ABSTRACT

A causality analyzer that provides attribution of causality effects for changes in revenue, margin and margin percentage is provided. The causality analyzer selects a reference time period and a comparison time period, and receives transaction data. Data cleansing and correction may be performed on the transaction data. The analyzer may then calculate change in total margin, percent margin and total revenue between the reference time period and the comparison time period using the transaction data. Each of the total margin, the percent margin and the total revenue may be disaggregated into one or more of a price effect, cost effect, quantity effect, product mix effect, customer mix effect, exchange rate effect, new and lost business, and an adjustment change. In this way the total margin, the percent margin and the total revenue are each defined as a summation of the individual causality effects. Causality effects may be disaggregated in such a way that the shared effects are allocated according to the proportion of percent change for each element, thereby unbiasing the effects to more accurately reflect actual causality.

19 Claims, 16 Drawing Sheets

U.S. PATENT DOCUMENTS

| | | | |
|---|---|---|---|
| 5,758,327 | A | 5/1998 | Gardner et al. |
| 5,808,894 | A | 9/1998 | Wiens et al. |
| 5,870,717 | A | 2/1999 | Wiecha |
| 5,873,069 | A | 2/1999 | Reuhl et al. |
| 5,878,400 | A | 3/1999 | Carter, III |
| 5,946,666 | A | 8/1999 | Nevo et al. |
| 6,009,407 | A | 12/1999 | Garg |
| 6,075,530 | A | 6/2000 | Lucas et al. |
| 6,078,901 | A | 6/2000 | Ching |
| 6,151,031 | A | 11/2000 | Atkins et al. |
| 6,211,880 | B1 | 4/2001 | Impink, Jr. |
| 6,320,586 | B1 | 11/2001 | Plattner et al. |
| 6,336,094 | B1* | 1/2002 | Ferguson et al. ............... 705/35 |
| 6,434,533 | B1 | 8/2002 | Fitzgerald |
| 6,536,037 | B1* | 3/2003 | Guheen et al. ................ 717/151 |
| 6,553,350 | B2 | 4/2003 | Carter |
| 6,665,577 | B2 | 12/2003 | Onyshkevych |
| 6,678,695 | B1 | 1/2004 | Bonneau et al. |
| 6,785,664 | B2 | 8/2004 | Jameson |
| 6,801,201 | B2 | 10/2004 | Escher |
| 6,812,926 | B1 | 11/2004 | Rugge |
| 6,851,604 | B2 | 2/2005 | Girotto et al. |
| 6,856,967 | B1 | 2/2005 | Woolston et al. |
| 6,856,972 | B1* | 2/2005 | Yun et al. .................... 705/36 R |
| 6,907,403 | B1 | 6/2005 | Klein et al. |
| 6,988,076 | B2 | 1/2006 | Ouimet |
| 7,015,912 | B2 | 3/2006 | Marais |
| 7,046,248 | B1 | 5/2006 | Perttunen |
| 7,076,463 | B1 | 7/2006 | Boies et al. |
| 7,080,026 | B2 | 7/2006 | Singh et al. |
| 7,092,929 | B1 | 8/2006 | Dvorak et al. |
| 7,133,848 | B2 | 11/2006 | Phillips et al. |
| 7,149,716 | B2 | 12/2006 | Gatto |
| 7,155,510 | B1 | 12/2006 | Kaplan |
| 7,218,325 | B1 | 5/2007 | Buck |
| 7,233,928 | B2 | 6/2007 | Huerta et al. |
| 7,254,584 | B1 | 8/2007 | Addison, Jr. |
| 7,308,421 | B2 | 12/2007 | Raghupathy et al. |
| 7,315,835 | B1 | 1/2008 | Takayasu et al. |
| 7,343,355 | B2 | 3/2008 | Ivanov et al. |
| 7,360,697 | B1 | 4/2008 | Sarkar et al. |
| 2001/0003814 | A1 | 6/2001 | Hirayama et al. |
| 2002/0007323 | A1 | 1/2002 | Tamatsu |
| 2002/0032610 | A1 | 3/2002 | Gold et al. |
| 2002/0042782 | A1 | 4/2002 | Albazz et al. |
| 2002/0052817 | A1 | 5/2002 | Dines et al. |
| 2002/0059229 | A1 | 5/2002 | Natsumeda et al. |
| 2002/0072993 | A1 | 6/2002 | Sandus et al. |
| 2002/0099596 | A1 | 7/2002 | Geraghty |
| 2002/0107819 | A1 | 8/2002 | Ouimet |
| 2002/0116348 | A1 | 8/2002 | Phillips et al. |
| 2002/0128953 | A1 | 9/2002 | Quallen et al. |
| 2002/0152133 | A1 | 10/2002 | King et al. |
| 2002/0152150 | A1 | 10/2002 | Cooper et al. |
| 2002/0156695 | A1 | 10/2002 | Edwards |
| 2002/0165726 | A1 | 11/2002 | Grundfest |
| 2002/0165760 | A1 | 11/2002 | Delurgio et al. |
| 2002/0178077 | A1 | 11/2002 | Katz et al. |
| 2002/0188576 | A1 | 12/2002 | Peterson et al. |
| 2002/0194051 | A1 | 12/2002 | Hall et al. |
| 2003/0009411 | A1 | 1/2003 | Ram et al. |
| 2003/0028451 | A1 | 2/2003 | Ananian |
| 2003/0033240 | A1 | 2/2003 | Balson et al. |
| 2003/0095256 | A1 | 5/2003 | Cargill et al. |
| 2003/0110066 | A1 | 6/2003 | Walser et al. |
| 2003/0115129 | A1 | 6/2003 | Feaver et al. |
| 2003/0126053 | A1 | 7/2003 | Boswell et al. |
| 2003/0130883 | A1 | 7/2003 | Schroeder et al. |
| 2003/0167209 | A1 | 9/2003 | Hsieh |
| 2003/0191723 | A1 | 10/2003 | Foretich et al. |
| 2003/0191832 | A1* | 10/2003 | Satyavolu et al. ............ 709/223 |
| 2003/0195810 | A1 | 10/2003 | Raghupathy et al. |
| 2003/0200185 | A1 | 10/2003 | Huerta et al. |
| 2003/0225593 | A1 | 12/2003 | Ternoey et al. |
| 2003/0229552 | A1 | 12/2003 | Lebaric et al. |
| 2004/0024715 | A1 | 2/2004 | Ouimet |
| 2004/0049470 | A1 | 3/2004 | Ouimet |
| 2004/0078288 | A1 | 4/2004 | Forbis et al. |
| 2004/0117376 | A1 | 6/2004 | Lavin et al. |
| 2004/0128225 | A1 | 7/2004 | Thompson et al. |
| 2004/0133526 | A1 | 7/2004 | Shmueli et al. |
| 2004/0193442 | A1 | 9/2004 | Kimata et al. |
| 2004/0267674 | A1 | 12/2004 | Feng et al. |
| 2005/0004819 | A1 | 1/2005 | Etzioni et al. |
| 2005/0096963 | A1 | 5/2005 | Myr et al. |
| 2005/0187852 | A1* | 8/2005 | Hwang .......................... 705/36 |
| 2005/0197857 | A1 | 9/2005 | Avery |
| 2005/0197971 | A1 | 9/2005 | Kettner et al. |
| 2005/0240601 | A1* | 10/2005 | Lyons et al. .................. 707/100 |
| 2005/0256778 | A1 | 11/2005 | Boyd et al. |
| 2005/0267831 | A1 | 12/2005 | Esary et al. |
| 2005/0278227 | A1 | 12/2005 | Esary et al. |
| 2006/0004861 | A1 | 1/2006 | Albanese et al. |
| 2006/0031178 | A1 | 2/2006 | Lehrman et al. |
| 2006/0031179 | A1 | 2/2006 | Lehrman |
| 2006/0047574 | A1 | 3/2006 | Sundaram et al. |
| 2006/0069585 | A1 | 3/2006 | Springfield et al. |
| 2006/0241923 | A1 | 10/2006 | Xu et al. |
| 2007/0294192 | A1 | 12/2007 | Tellefsen |
| 2008/0059280 | A1 | 3/2008 | Tellefsen et al. |
| 2008/0126264 | A1 | 5/2008 | Tellefsen et al. |

FOREIGN PATENT DOCUMENTS

| | | |
|---|---|---|
| WO | WO 2005/1199500 | 12/2005 |

OTHER PUBLICATIONS

Vasigh,Bijan; Gorjidooz,Javad, Productivity Analysis of Public and Private Airpports: A causal Investigation, Journal of Air Transportation, vol. 11, No. 3, pp. 144-163.*

"PCT International Search Report and the Written Opinion of the International Searching Authority", Application No. PCT/US07/18663, mailed Aug. 26, 2008.

"PCT International Search Report and the Written Opinion of the International Searching Authority", Application No. PCT/US 07/23740, mailed Mar. 3, 2008.

"PCT International Search Report", Application No. PCT/US07/10754, mailed Nov. 7, 2007.

"PCT International Search Report", Application No. PCT/US07/11571, mailed Jan. 7, 2008.

"PCT International Search Report", Application No. PCT/US05/14879, mailed Apr. 16, 2007.

"Written Opinion of the International Searching Authority", Application No. PCT/US05/14879, mailed Apr. 16, 2007.

"Written Opinion of the International Searching Authority", Application No. PCT/US05/14981, mailed Nov. 27, 2006.

"Written Opinion of the International Searching Authority", Application No. PCT/US05/14883, mailed Oct. 3, 2006.

Origin 7.0 Help (including 21 sheets of screen shots), 2000.

Microsoft Excel 2000, 1985-1999.

Morn, Michael V. And Robert L. Rosiello, "Managing Price, Gaining Profit," Harvard Business Review, pp. 84-93 (Sep.-Oct. 1992).

"Net Commerce Launches Its FastTrack Configurator and FasPac Catalog Utility", Apr. 17, 2001, Business Wire. New York. p. 1.

"SPEX Assesses B2C and B2B Electronic Commerce Software Maturity", PR Newswire. New York: Apr. 28, 2000, p. 1.

Murphy, Diane R., "The Exciting Role of the Credit Manager in the Expanding E-Commerce Marketplace", Business Credit, vol. 10, No. 9, p. 64, Oct. 2000.

Spanbauer, Scott et al., "You've got E-mail", PC World, vol. 16, No. 6, p. 135, Jun. 1998.

Beidl, Richard et al., "The Coming of Risk-Based Pricing: Part Two", Oct. 2000, Mortgage Banking, Washington, vol. 61, Issue 1.

Walker, Kenton B. et al., "Planning a Revenue Stream System in an E-Business Environment", 2001, Industrial Management—Data Systems, p. 406-413, 8/9;ABI/INFORM Global.

"eMerchant, magic Software's Powerful New Business-to-Business E-commerce Solution. Wins 'Best of Show' at Internet Commerce Expo", Apr. 1, 1999, Business Wire, (2 pages).

Bourne, Humphrey, "Pricing the Strategic Implications", Mar. 1999, Management Accounting. Magazine for Chartered Management Accountants; vol. 77, Issue 3.

Bhattacharya, Anindya et al. "Using 'smart' pricing to increase profits and maximize customer satisfaction", Aug. 2001, The National Public Accountant; vol. 25, Issue 6.

Kim, Byung-Do et al., "Modeling the Distribution of Price Sensitivity and Implications for Optimal Retail Pricing", Jul. 1995, Journal of Business & Economic Statistics; vol. 13, Issue 3.

Levy, Michael et al., "Emerging Trends in Retail Pricing Practice: Implications for Research", 2004, Journal of Retailing; vol. 80.

Hung, Chao-Shun, "Conjectural Variations and Market Performance in a Differentiated Product Industry", Dec. 1991, Atlantic Economic Journal; vol. 19, Issue 4.

Dawes, John, "Assessing the Impact of a Very Successful Price Promotion on Brand, Category and Competitor Sales", 2004, The Journal of Product and Brand Management; vol. 13, Issue 5.

Leeflang, Peter S. H. et al., "Marketing Decisions Based on Econometric Models", Spring 2002, Marketing Research; vol. 14, Issue 1.

Lucke, Dorothea et al., "A Note on R&D and Price Elasticity of Demand," Nov. 2005, Jahrbucher fur Nationalokonomie and Statistik; vol. 225, Issue 6.

Caru, Antonella et al. "Profitability and Customer Satisfaction in Services: An Integrated Perspective Between Marketing and Cost Management Analysis", 1999, International Journal of Service Industry Management; vol. 10, Issue 2.

Tollefson, John O. et al., "Aggregation Criteria in Normative Market Segmentation Theory", Aug. 1978, Journal of Marketing Research; vol. 15.

Coulter, Keith S., "Decreasing Price Sensitivity Involving Physical Product Inventory: A Yield Management Application", 2001, The Journal of Product and Brand Management; vol. 10, Issue 5.

Mills, Don, "Oil Rises on Report Showing Gasoline Supply Decline", National Post, Ont; May 30, 2003.

Keenan, Faith, "The Price is Really Right," Business Week, Mar. 31, 2003.

Chan Choi, S., et al., "Product Positioning under Price Competition", Management Science, vol. 36, Issue 2, Feb. 1990, pp. 175-199.

Kirschen, D.S., et al., "Factoring the Elasticity of Demand in Electricity Prices", IEEE Transactions on Power Systems, vol. 15, No. 2, May 2000, pp. 612-617.

* cited by examiner

|  | Reference Time Period | | Comparison Time Period | |
|---|---|---|---|---|
| Product | Price | Volume | Price | Volume |
| A | $1 | 900 |  |  |
| B | $4 | 500 | $4 | 500 |
| C | $10 | 700 | $10 | 700 |
| D | $12 | 200 | $12 | 200 |
| E |  |  | $15 | 75 |
| F |  |  | $20 | 125 |

FIG. 4A

|  | Reference Time Period | | Comparison Time Period | |
|---|---|---|---|---|
| Product | Price | Volume | Price | Volume |
| A | $1 | 900 | $1 | 0 |
| B | $4 | 500 | $4 | 500 |
| C | $10 | 700 | $10 | 700 |
| D | $12 | 200 | $12 | 200 |
| E | $15 | 0 | $15 | 75 |
| F | $20 | 0 | $20 | 125 |

FIG. 4B

| Product Family | Revenue 2005 Q2 | Revenue 2005 Q1 | Delta | Price | Volume | Mix |
|---|---|---|---|---|---|---|
| Networking | $978,750 | $850,450 | $128,300 | $105,000 | -$52,500 | $75,800 |
| Memory | $625,350 | $425,675 | $199,675 | $20,500 | $150,000 | $29,175 |
| Microcontrollers | $1,045,500 | $1,075,350 | -$29,850 | $65,000 | -$45,250 | -$49,600 |
| Wireless | $760,725 | $624,400 | $136,325 | $20,575 | $78,550 | $37,200 |

Base revenue — Comparison revenue — Revenue difference — The sum of these effects explain the delta for each product family

FIG. 7

Disaggregation of GM%
Q1 and Q2 FY2009
Contributions to Change in Total Gross Margin % -- Expressed in Basis Points GM% changed from  37.18%  to  38.05%  =  87

| | | | |
|---|---:|---:|---:|
| Change in GM% from base to comparison period (basis points) | | | 87 |
| | | | |
| Change in dollar price | | | (147) |
|   Change in local currency price | | (109) | |
|     Pure price change (same customers) | | (71) | |
|       Price Increases | 28 | | |
|       Price Decreases | (99) | | |
|     Average selling price change (unmatched customers) | | (38) | |
|       Price Increases | 39 | | |
|       Price Decreases | (77) | | |
|   Change in foreign exchange | | (38) | |
| Change in unit cost | | | 108 |
|   Change in local currency unit cost | | 96 | |
|   Change in cost foreign exchange | | 12 | |
| Change in mix | | | 138 |
|   Change in product-customer mix | | 232 | |
|     Change in customer mix within product | 61 | | |
|     Change in mix among products | 171 | | |
|   Change in product mix with un-matched customers | | (93) | |
| | | | |
| Contribution from Lost and New business | | | 9 |
|   Change in margin for lost business (material not sold) | | (28) | |
|   Change in margin for new business (new material) | | 52 | |
|   Change of new/lost Volume change | | (15) | |
| | | | |
| Contribution from adjustment change | | | (21) |

FIG. 10

|         | Time 1   | Time 2   | Change   |
|---------|----------|----------|----------|
| Quantity| 100      | 200      | 100      |
| Price   | $ 1.00   | $ 1.00   | $ -      |
| Revenue | $ 100.00 | $ 200.00 | $ 100.00 |

⎫ 1302

|         | Time 1   | Time 2   | Change   |
|---------|----------|----------|----------|
| Quantity| 100      | 100      | 0        |
| Price   | $ 1.00   | $ 0.90   | $ (0.10) |
| Revenue | $ 100.00 | $ 90.00  | $ (10.00)|

|         | Time 1   | Time 2   | Change   | Individual Effect | Interaction |
|---------|----------|----------|----------|-------------------|-------------|
| Quantity| 100      | 200      | 100      | $ 100.00          |             |
| Price   | $ 1.00   | $ 0.90   | $ (0.10) | $ (10.00)         |             |
| Revenue | $ 100.00 | $ 180.00 | $ 80.00  | $ 90.00           | $ (10.00)   |

|         | Base   | Change  | Change x Base | Shared   | Total Effect |
|---------|--------|---------|---------------|----------|--------------|
| Quantity| $ 1.00 | 100     | $ 100.00      | $ (9.09) | $ 90.91      |
| Price   | 100    | $ (0.10)| $ (10.00)     | $ (0.91) | $ (10.91)    |
| Total   |        |         | $ 90.00       | $ (10.00)| $ 80.00      |

FIG. 13C

| Customer Product Exch Rates | Period 0 | | | | | | Period t | | | | | |
|---|---|---|---|---|---|---|---|---|---|---|---|---|
| | Price | | | Unit Cost | | | Price | | | Unit Cost | | |
| | Local | Dollar | Exch Rate | Local | Dollar | Exch Rate | Local | Dollar | Exch Rate | Local | Dollar | Exch Rate |
| C1P1 GBP EUR | 5.00 | $ 10.00 | $ 2.0000 | 4.50 | $ 6.00 | $ 1.3333 | 5.00 | $ 15.00 | $ 3.0000 | 4.50 | $ 7.50 | $ 1.6667 |
| C1P2 SGD WON | 100.00 | $ 25.00 | $ 0.2500 | 62.50 | $ 12.50 | $ 0.2000 | 100.00 | $ 20.00 | $ 0.2000 | 60.00 | $ 10.00 | $ 0.1667 |
| C2P1 EUR NT$ | 3.75 | $ 5.00 | $ 1.3333 | 15.00 | $ 2.50 | $ 0.1667 | 3.00 | $ 5.00 | $ 1.6667 | 18.75 | $ 2.50 | $ 0.1333 |
| C2P2 WON SGD | 100.00 | $ 20.00 | $ 0.2000 | 36.00 | $ 9.00 | $ 0.2500 | 150.00 | $ 25.00 | $ 0.1667 | 62.50 | $ 12.50 | $ 0.2000 |

| Effect | Method | | |
|---|---|---|---|
| | Biased | Complement | Finite Differ |
| On Revenue by . . . | | | |
|    Price (local currency) | $ 140.00 | $ 70.00 | $ 71.67 |
|    Exchange Rate (selling) | $ 10.00 | $ 180.00 | $ 143.53 |
|    Volume | $ 550.00 | $ 666.67 | $ 582.99 |
|    Mix | $ 200.00 | $ (16.67) | $ 101.82 |
| On Cost by . . . | | | |
|    Unit Cost (local currency) | $ 123.50 | $ 80.00 | $ 82.41 |
|    Exchange Rate (manufacturing) | $ (68.50) | $ 5.00 | $ (0.49) |
|    Volume | $ 295.00 | $ 333.33 | $ 312.90 |
|    Mix | $ 60.00 | $ (8.33) | $ 15.18 |
| On Margin by . . . | | | |
|    Price (local currency) | $ 140.00 | $ 70.00 | $ 71.67 |
|    Unit Cost (local currency) | $ (123.50) | $ (80.00) | $ (82.41) |
|    Exchange Rates | $ 78.50 | $ 175.00 | $ 144.02 |
|    Volume | $ 255.00 | $ 333.33 | $ 270.08 |
|    Mix | $ 140.00 | $ (8.33) | $ 86.64 |

SYSTEMS AND METHODS FOR A CAUSALITY ANALYZER

CROSS REFERENCE

This invention is a continuation-in-part of application Ser. No. 12/027,193 entitled "Systems and Methods for a Revenue Causality Analyzer" filed Feb. 6, 2008, the entirety of which is hereby incorporated by reference.

BACKGROUND OF THE INVENTION

This invention relates generally to revenue causality analyzer system and method to provide fast and efficient analysis of revenue causality for price management and business management. More particularly, the present invention relates to a method for analyzing changes in revenue over two time periods to attribute the components causally responsible for the change in revenue.

Between two time periods revenues change. The difference in revenues between the time periods is the change in revenue. An understanding of change in revenue causality is very important to effective price management. As such, there is a desire to accurately be able to attribute changes in revenue to causal factors. Within this application causal factors may also be referred to as causal effects or causalities. These factors include changes in product pricing, changes in the volume of products sold, changes in product mix sold, changes in costs, changes in exchange rates, and any additional factors that may play a role in revenue changes.

When revenue change is due to only one causality factor, the causality analysis is very easily determined. However, when multiple factors are involved, it traditionally has been difficult, if not impossible, to attribute the amount of change of revenue to the appropriate factors. Additionally, with the more products included in the system the more complex the analysis becomes.

Currently, human intuition must be utilized to make a rough estimation of the importance of each causal factor to the change in revenue. Alternatively, computer systems may be utilized that provide some measure of revenue causality attribution, however, these current systems either make gross estimations in their computation, or are intermittently able to analyze revenue causality. Additionally, these computations may be difficult and may require large processing resources to effectuate, especially when the system includes large numbers of products.

For the typical business, the above systems are still too inaccurate, unreliable, and intractable in order to be utilized effectively for price management and analysis. Businesses, particularly those involving large product sets, would benefit greatly from the ability to have accurate revenue causality characterization.

It is therefore apparent that an urgent need exists for an improved system and method for revenue causality analysis and attribution that is both accurate and efficient. This solution would replace current revenue analysis techniques with a more accurate system; thereby increasing effectiveness in downstream price management that utilizes the revenue analysis.

SUMMARY OF THE INVENTION

To achieve the foregoing and in accordance with the present invention, a method and system for a causality analyzer is provided. Such a system is useful for a business to analyze revenue margin and margin percent changes, and attribute those changes to causal effects. Such an analysis may be utilized by the business for price management.

One advantage of the present invention is that the causality analyzer is capable of accurately attributing causality effects for changes in revenue, margin and percent margin quickly and efficiently. The causality analyzer is useful in association with products, and comprises a selector for selecting a reference time period and a comparison time period. The causality analyzer may also include a causality modeler configurable to receive transaction data and calculate change in total margin, percent margin and total revenue between the reference time period and the comparison time period using the transaction data. The causality analyzer may, in some embodiments, include a missing data exchanger and data error corrector which corrects and cleanses the transaction data prior to consumption by the causality modeler.

The transaction data includes reference revenue and comparison revenue, as well as reference costs and comparison costs for the reference time period and comparison time period, respectively. The change in revenue may be calculated by subtracting revenue from the two time periods. Margin change may be calculated by determining the margin for each period by subtracting cost from revenue for each time period and then finding the difference. Likewise, margin percentage is found by subtracting cost from revenue and dividing the result by revenue for the time period. Once percent margin is found for each time period, the difference between time periods' percent margin may be calculated.

A causality attributor may be configurable to disaggregate each of the total margin, the percent margin and the total revenue by price effect, cost effect, quantity effect, product mix effect, customer mix effect, exchange rate effect, new and lost business, and an adjustment change. In this way the total margin, the percent margin and the total revenue are each defined as a summation of the individual causality effects.

The price and quantity effect, as well as price and exchange rate effects may be disaggregated in such a way that the shared effects are allocated according to the proportion of percent change for each element, thereby unbiasing the effects to more accurately reflect actual causality.

These and other features of the present invention will be described in more detail below in the detailed description of the invention and in conjunction with the following figures.

BRIEF DESCRIPTION OF THE DRAWINGS

In order that the present invention may be more clearly ascertained, one embodiment will now be described, by way of example, with reference to the accompanying drawings, in which:

FIG. 4A shows an illustration of a raw exemplary data chart for the revenue causality analyzer of FIG. 1;

FIG. 4B shows an illustration of a prepared exemplary data chart for the revenue causality analyzer of FIG. 1;

FIG. 7 shows an illustration of an exemplary output for the revenue causality analyzer of FIG. 1;

FIG. 10 illustrates a table of the causality of gross margin percentage between two time periods;

FIGS. 13A to 13C illustrate tables showing the calculation of price, quantity and interactive effect to generate total effect, in accordance with some embodiments;

FIG. 14 illustrates a table showing the data used between two time period for causality calculation, in accordance with some embodiments.

DETAILED DESCRIPTION OF THE INVENTION

I. Overview of Causality Analysis

The present invention will now be described in detail with reference to several embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

Figure 1:
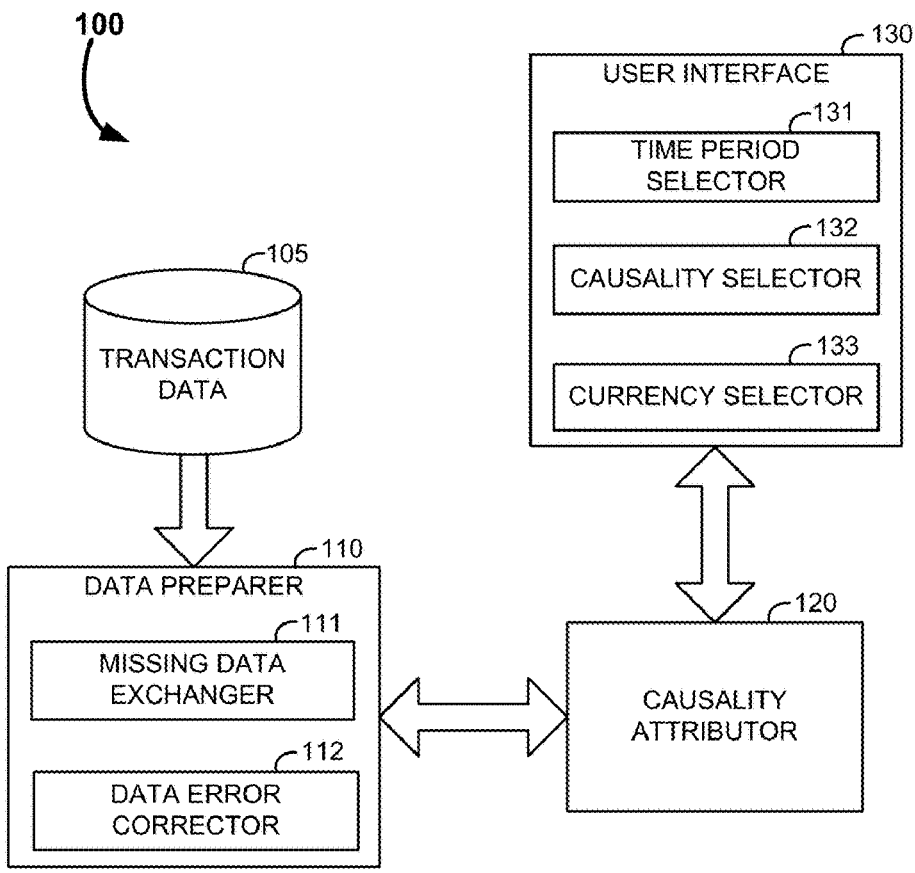
FIG. 1 shows a block diagram illustrating the revenue causality analyzer in accordance with an embodiment of the present invention.

To facilitate discussion, FIG. 1 shows a block diagram illustrating the Causality Analyzer 100 in accordance with an embodiment of the present invention. The Causality Analyzer 100 receives Transaction Data 105 via the Data Preparer 110. The Data Preparer 110 prepares Transaction Data 105 for use by the Causality Attributor 120. The Data Preparer 110 includes a Missing Data Exchanger 111, and a Data Error Corrector 112. The Missing Data Exchanger 111 replaces any missing data, and the Data Error Corrector 112 corrects errors in the data set.

The Data Preparer 110 is coupled to the Causality Attributor 120. The Causality Attributor 120 calculates the causality effects by utilizing causality equations (including total margin, total revenue and margin percent). The Causality Attributor 120 couples to a User Interface 130. The User Interface 130 includes a Time Period Selector 131, a Causality Selector 132 and a Currency Selector 133. The Time Period Selector 131 enables the user to select time periods for comparison by the Causality Attributor 120. The Causality Selector 132 enables the user to select the causal effects of interest for analysis by the Causality Attributor 120. Lastly, the Currency Selector 133 enables the user to select for the currency of interest for analysis by the Causality Attributor 120.

Figure 2:
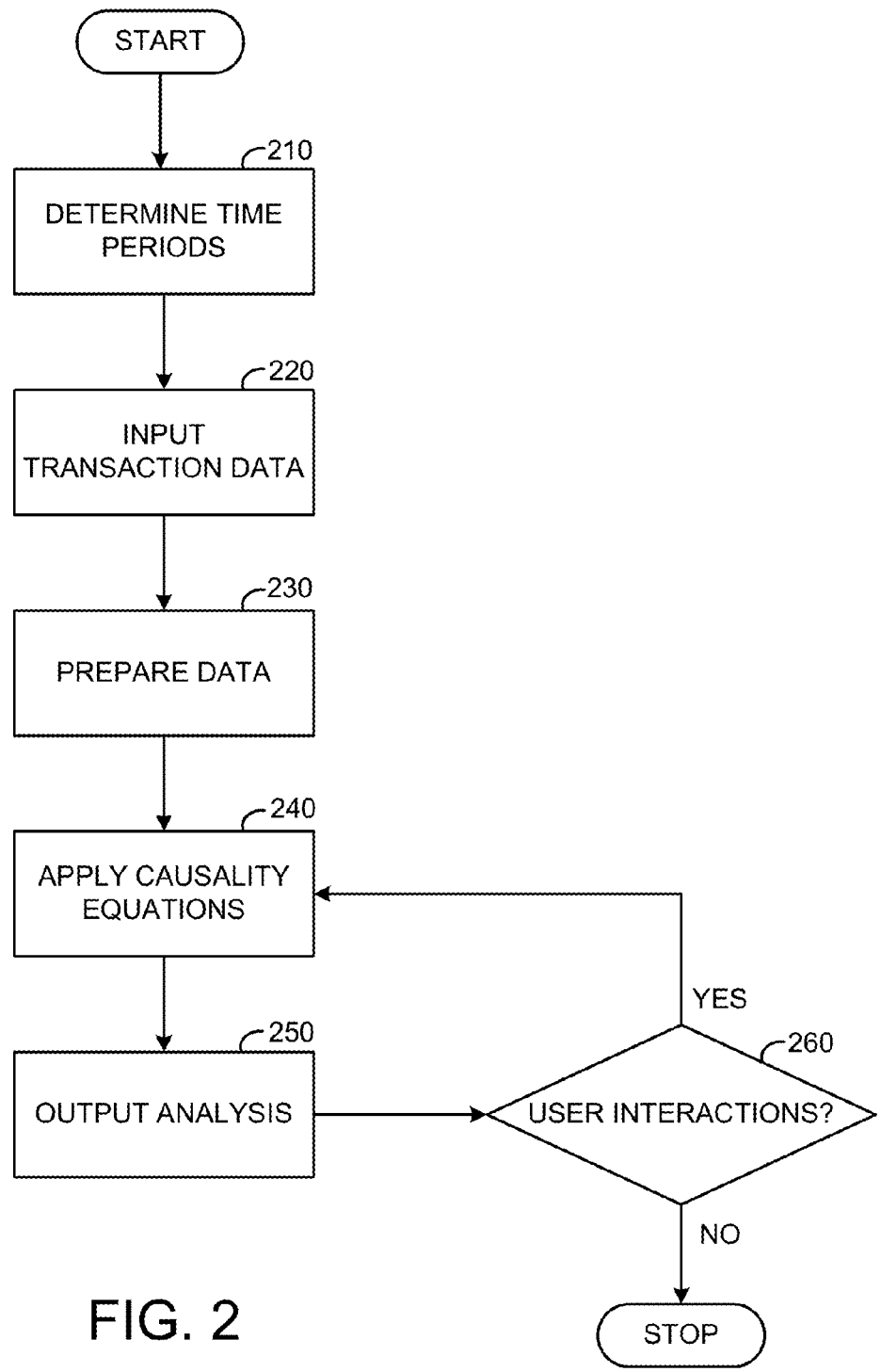
FIG. 2 shows a flow chart illustrating the process for analyzing revenue causality for the revenue causality analyzer of FIG. 1.

FIG. 2 shows a flow chart 200 illustrating the process for analyzing causality in accordance with the Causality Analyzer 100 illustrated in FIG. 1. At step 210, the time periods to be compared are selected. In some embodiments, a reference time period and a comparison time period is selected. In some embodiments, these time periods may include consecutive financial quarters. In alternate embodiments, the time periods may include similar times brackets on a recurring annual basis. Moreover, it may be advantageous, in some embodiments, to choose time periods prior and post management or production changes. In sum, any time periods may be selected for comparison depending on the requirements of the business. Additionally, in some embodiments, multiple time periods may be compared against another in order to show progressive trends. In these analyses, the process described in flow chart 200 is repeated for each set of time periods to be compared, and upon output, at step 250, all results may be compiled for use by the user.

In step 220, Transaction Data 105 for each time period selected in step 210 may be input for further processing. Input may be preformed manually, with the user entering transaction data. Alternatively, in some embodiments, Transaction Data 105 may be electronically compiled through point-of-sales data from a cash register, invoice compilation, or electronic bookkeeping software. Transaction Data 105 includes, but is not limited to, products, the price of each product, volume of each product sold, cost data and exchange rate data. Cost data may include costs per product, or cost estimations. In some embodiments, product, price and volume is the only data required in order to perform a comprehensive revenue causality analysis of price effect, volume effect and mix effect. These data are routinely recorded by most businesses, and thus the present invention enables extensive, accurate revenue causality analysis with minimal data collection effort from the business.

In step 230, the inputted Transaction Data 105 is prepared for analysis. Preparation may include entering missing data values and correcting data errors. Such errors may exist due to changes in the product line, data input errors, software glitches or human errors.

In step 240, the prepared data is run through causality equations, which determine the amount of revenue, margin or percent margin attributable to each causality effect.

In step 250, the results of the causality equations are outputted for user consumption. Results may then be used in downstream applications and for raw consumption for price management purposes. The output may be in terms of a dollar amount, wherein the summation of all the causal effects is equal the change in revenue between the reference time period and the comparison time period. Additionally, the output may be a function of marginal changes (both total and as a percentage).

Then, in step 260, the user may choose to interact with the outputted results in order to make alterations to transaction data, hone in on specific results or otherwise segregate the outputted results in order to increase their functionality. If the user decides to interact with the outputted data then the process returns to step 240, where the causality equations are run again. The outputted results may then be updated, in step 250, to incorporate the interactions. Next, the user again is given the option to interact with the outputted results, in step 260. Otherwise, if the user does not choose to interact with the results the process ends.

Individual steps of the revenue causality analysis 200 will be discussed separately in more detail below.

II. Data Preparation

Figure 3:
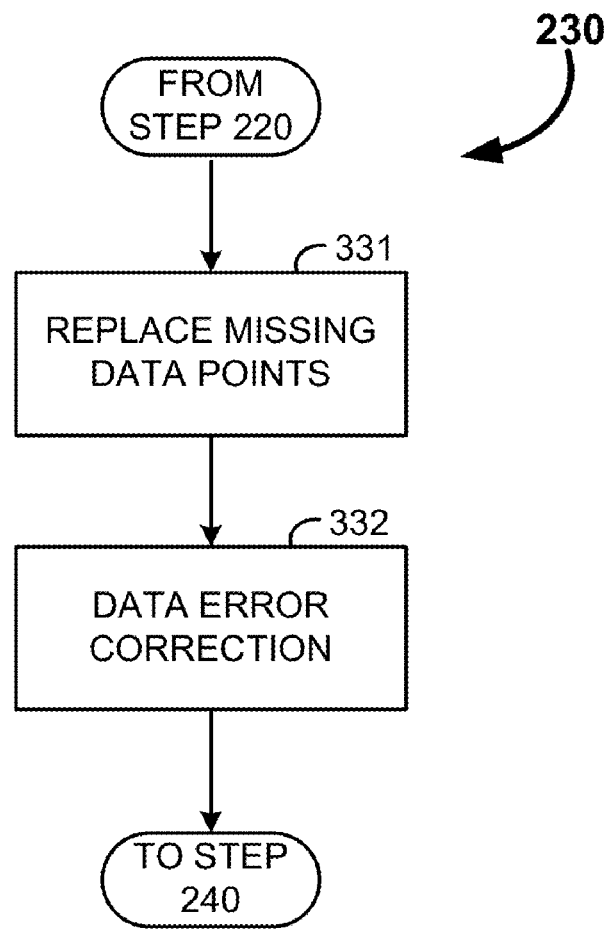
FIG. 3 shows a flow chart illustrating the process for a data preparation for the revenue causality analyzer of FIG. 1.

FIG. 3 shows a flow chart expounding the Preparation of Data 230. In this process missing data points are replaced, in step 331. Then, in step 332, errors in the data are corrected for.

Even in immaculately maintained business records, data will be missing when a product is introduced or discontinued during or between the reference and comparison time periods. An example of such a situation is shown in the exemplary data chart illustrated in FIG. 4A. In this table, six products are shown, A-F, in the leftmost column. Price and product sales volume are shown in the remaining columns for both the reference and comparison time periods. Time periods are labeled at the top row. Price and volume columns are referenced by the labels in the second row. Here the price information is shown in dollars; however, any denominator may be used. Likewise, in the example, volume is given in units; however, any measure of quantity may be used, such as lots or batches. In this exemplary data set, product A is seen to be discontinued in the comparison time period, as seen by missing data points. Similarly, products E and F are introduced in the comparison time period, but do not exist during the reference time period. In FIG. 4B, the exemplary data table of FIG. 4A is again shown, however in this data table the missing data points have been replaced with functional data points. These replacements are seen as lighter numerals for the comparison data for product A, and reference data for products E and F.

Figure 5:
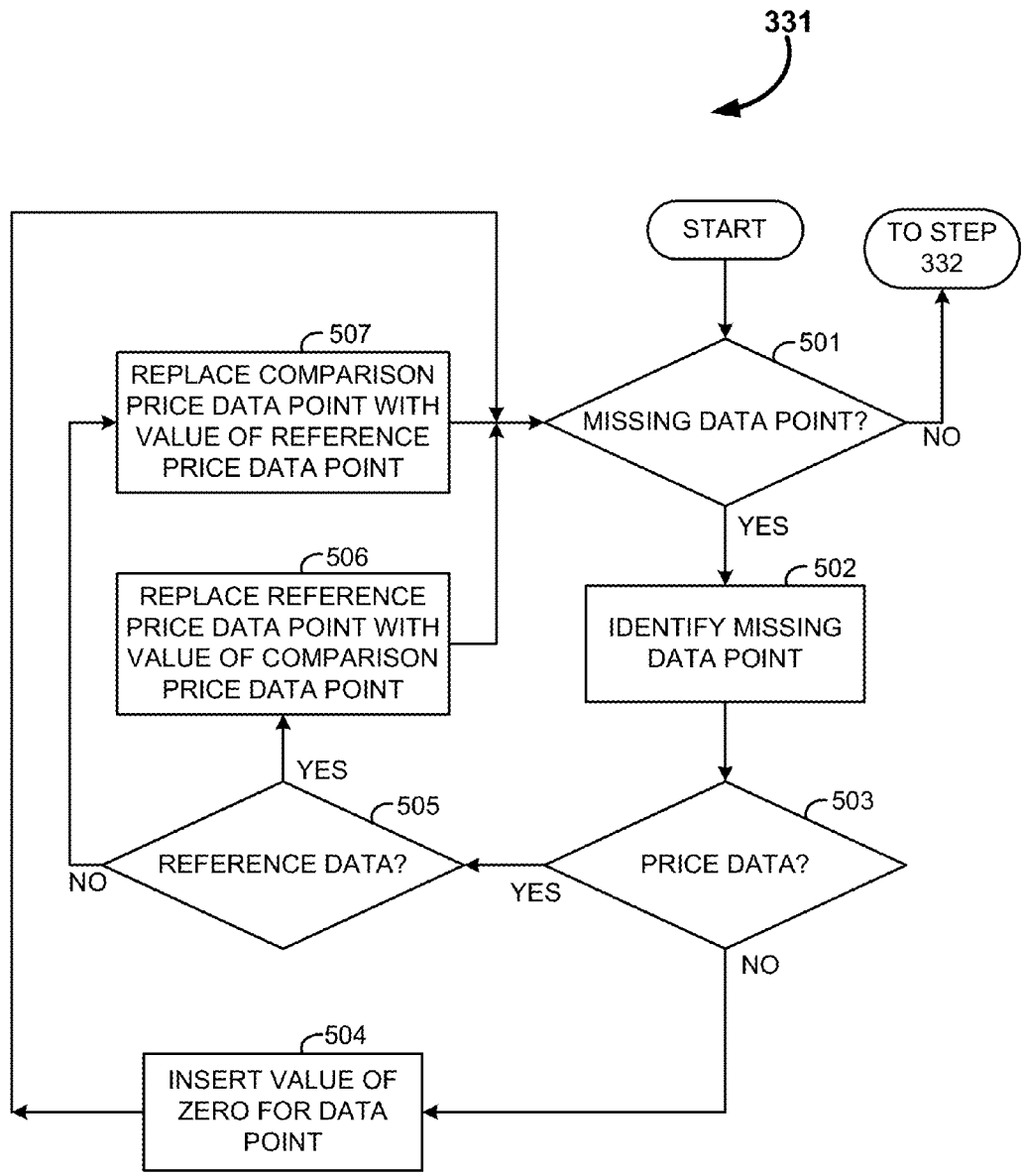
FIG. 5 shows a flow chart illustrating the process for replacement of missing data for the revenue causality analyzer of FIG. 1.

FIG. 5 shows a flow chart 331 illustrating the process of replacing missing data points. In step 502, a search is done of the data set to determine if any data points are missing. If no data points are missing the process ends, otherwise the data point is identified in step 502. Then, in step 503, an inquiry is made as to if the missing data point identified is price data. If the data point is not price data, then the missing data point is replaced with a zero value, in step 504. This replacement occurs whenever product sales volume data is missing. After the data is replaced, the process returns to step 502, to determine if there are any remaining missing data points.

Otherwise, if the missing data point is pricing data, in step 503, an inquiry is made as to if the missing data point is from the reference data set, in step 505. If the missing data point is a reference data point, then the missing data point is replaced with the pricing data for the same product from the comparison time period data set, in step 506. After the data is replaced the process returns to step 502, to determine if there are any remaining missing data points.

Else, if the missing data point is not a reference data point (comparison data point), then the missing data point is replaced with the pricing data for the same product from the reference time period data, in step 507. After the data is replaced, the process returns to step 502, to determine if there are any remaining missing data points.

As previously noted, in some embodiments, data preparation may include Correction of Data Errors 332. Obvious data discrepancies, such as negative price data, may be corrected in this step. In some embodiments, data values greater than an expected values by a predetermined value may also be corrected. For example, in some embodiments, if sales volume data is greater than two standard deviations from the expected sales volume, the data point may be corrected to reflect the expected value instead of the erroneous value.

Moreover, in some embodiments, where Transaction Data 105 includes redundant data, conflicting data may be corrected. For example, if Transaction Data 105 includes price, volume and aggregate revenue data, a comparison may be made between the transaction revenue data and the calculated revenue found by multiplying together price and volume data. If a discrepancy exists, the data may be combed in order to identify and correct the erroneous transaction data.

After Transaction Data 105 has been Prepared 230 it may be analyzed by the causality equations to determine to what extent each causal effect contributes to the change in revenue.

III. Causality Model Disaggregation

Figure 11:
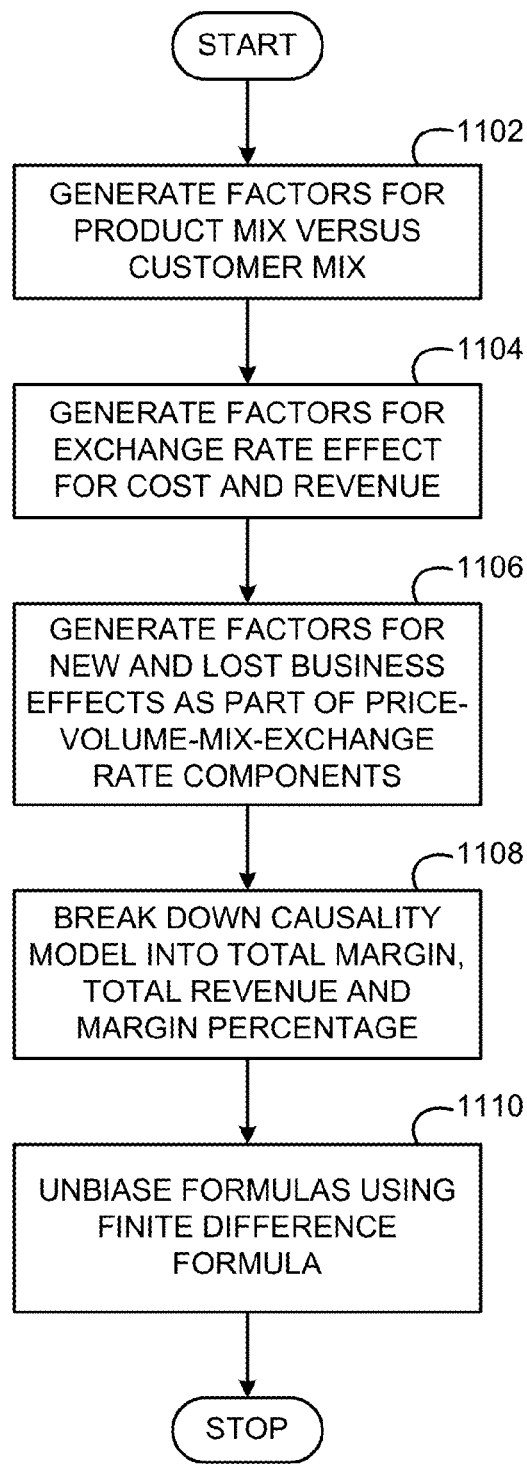
FIG. 11 illustrates a process for generating an enhanced causality model, in accordance with some embodiments.

FIG. 11 illustrates a process for generating an enhanced disaggregated causality model, in accordance with some embodiments. In this example flow chart, the first step in generation of causality models is the generation of factors for product mix vs. consumer mix (at 1102).

Next, factors may be generated for exchange rate effect for both cost and revenue (at 1104). Currently, average exchange rates are used for this factor. The average exchange rate for the entire period, however, may not accurately reflect exchange rate values for transactions which occur predominantly within narrow time windows during the period. As such, using an average exchange rate may misrepresent the importance of the exchange rate factor in the causality model. This may be particularly pronounced when currencies are volatile and divergent in their trends. As an alternative to average exchange rates, monthly exchange rate data may be utilized, in some embodiments, in order to reduce errors resulting from volatile exchange rates. Alternatively, some other finite difference technique may be utilized in order to attribute exchange rate data.

Next, factors relating to new and lost business effects are generated (at 1106). New and lost business effects may be generated as part of price, volume, mix, and exchange rate components.

Then, the causality model may be broken down into total margin, total revenue and margin percentage (at 1108). Margin percentage (percent of gross margin) is the dollar margin divided by revenue. These breakdowns may be further unbiased using finite difference formulas (at 1110).

IV. Percent Margin Causality

Moving now to FIG. 10, percent of gross margin causality may be analyzed as illustrated in the table. Margin percent causality is very similar to margin causality, except that it focuses on the percentage of margin instead of the total margin amount. A pricing user would view margin percent causality instead of margin causality when one wants to investigate where margin leakage is happening, to capture pricing inefficiency rather than diagnose poor results. In this example table, changed in percent margin between two time periods "base" and "comparison" is broken down into causal elements for analysis purposes. In this example, the base time is quarter 1 of 2009, and the comparison period is the second fiscal quarter.

The contributions of gross margin percentage are expressed in basis points (i.e., 100 basis points equate to 1% gross margin change). Between these periods, the total gross margin change was from 37.18% to 38.05%, or 87 basis points. The change in gross margin percentage is then disaggregated by change in dollar price, change in unit cost, change in mix, contribution in lost and new business and adjustment change. Some of the factors may be further divided into more detail, such as dollar price being disaggregated further into local currency price, pure price changes, average selling price changes and changes in exchange.

In the illustrated example, it is clear that the bulk of the increase in percent margin came from changes in costs and mix effects. Change in dollar price and adjustment change, on the other hand, were responsible for decreases in gross margin.

V. Interaction Effect Unbiasing

Figure 12A:
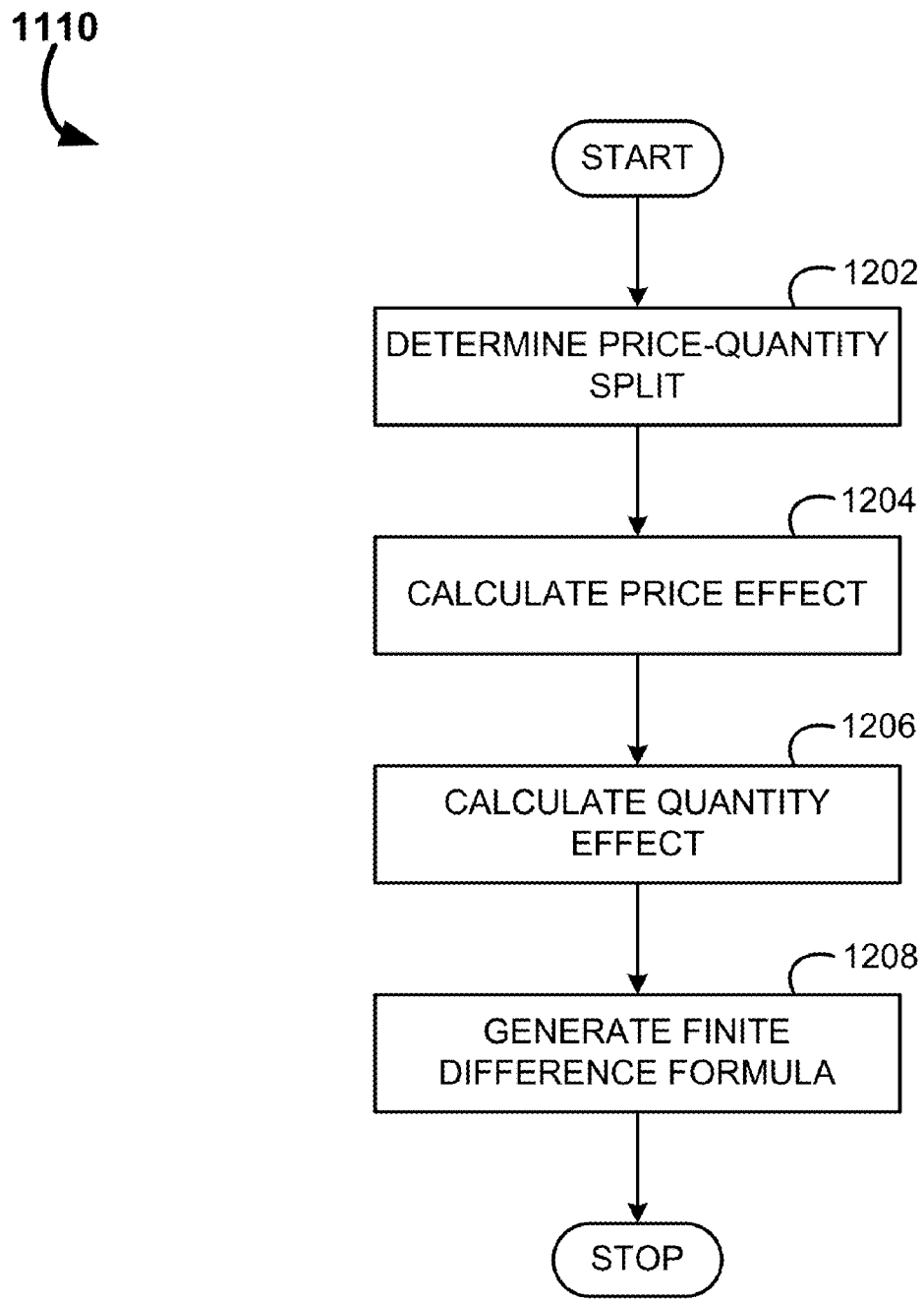
FIG. 12A illustrates a process for unbiasing causality formulas using finite difference formulas, in accordance with some embodiments.

FIG. 12A illustrates a process for unbiasing causality formulas using finite difference formulas, in accordance with some embodiments. This process includes determining a price-quantity (or other interaction) split (at 1202). While price and quantity interactions are being unbiased in this particular example process, additional interaction effects may be likewise unbiased using finite difference techniques. These include price-exchange rate interactions, and removal of timing between quantity and currency calculations. This split may utilize any allocation between the effects, such as an even divide or, in some embodiments, in proportion to the percent change in each of the factors (i.e., finite difference approach).

Next, the price effect (at 1204) and quantity effect (at 1206) are calculated. These calculations are for the "pure" effect not including any shared interactions. Lastly, using the aforementioned split, the finite difference formula may be generated (at 1208) in order to allocate the shared effect.

Figure 12B:
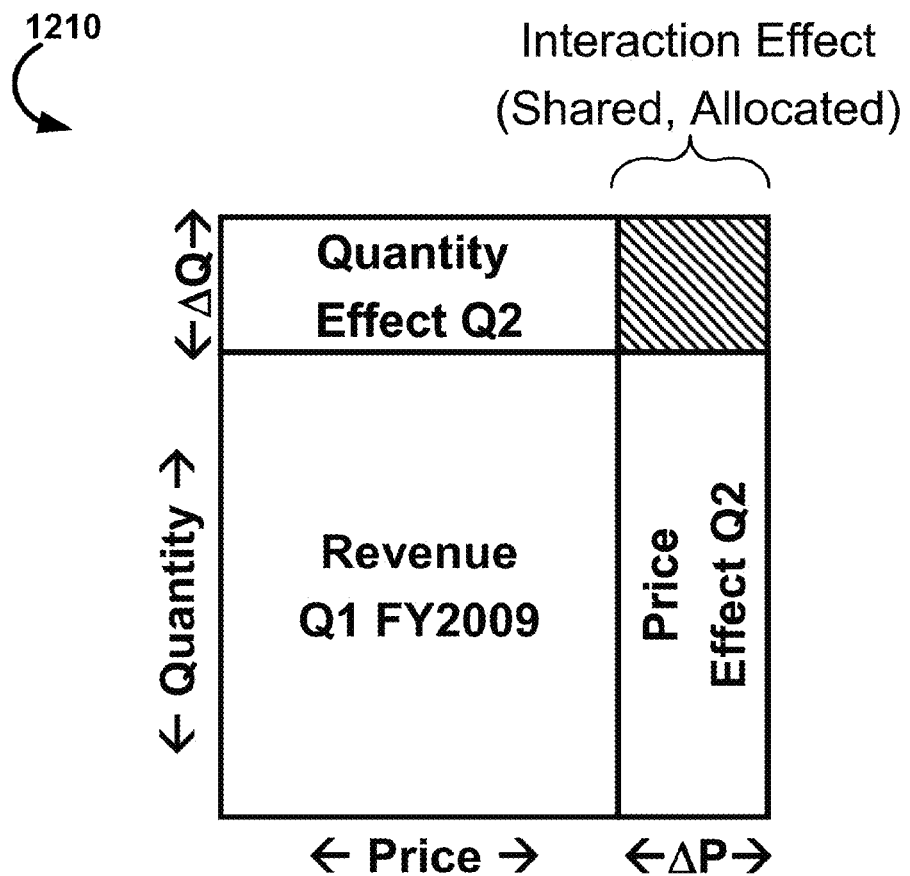
FIG. 12B illustrates a diagram showing the interaction effect, in accordance with some embodiments.

FIG. 12B illustrates a diagram 1210 showing the interaction effect, in accordance with some embodiments. Here, the revenue from the first quarter is illustrated by the inner box. The entire outer box is the revenue for the second quarter revenue. Quantity effect is seen in the top rectangle (revenue change which is caused exclusively by change in quantity). Price effect is seen in the tall right side rectangle (revenue change which is caused exclusively by change in price). The remaining shaded rectangle is interactive or shared effect, which is allocated via the finite difference formula in order to accurately assign correct causality to each effect.

FIGS. 13A to 13C illustrate tables showing the calculation of price, quantity and interactive effect to generate total effect, in accordance with some embodiments. In FIG. 13A, basic scenarios relating to change in revenue due to change in price only (at 1304), and change in volume only (at 1302) are illustrated. These simplified scenarios are useful in illustrating how a single alteration in either price or quantity sold results in a revenue change.

FIG. 3B illustrates a scenario where the price and quantity change. Individual effects of the changes are seen at 1312, and the interactive effect is seen at 1314. Decreasing price results in a ten dollar loss, but the increased sales is responsible for an additional 100 dollars of revenue. However, the interactive effect is an additional ten dollar loss in order to accurately reflect actual revenue difference between the first time period and second time period.

Generally, price effect is defined as the change in price multiplied by the quantity at the comparison (second) time period. The quantity effect is the change in quantity times the price in the first (base) time period. A complimentary method would define the price effect as the change in price times the quantity at the first (base) time period; and quantity effect as the change in quantity times the price at the second (comparison) time period. Either of these methods of calculating price or quantity effects overstates one or the other effect by assigning the entirety of the shared effect to a single causality. By splitting the shared effect by proportion of percent change for each factor, a more accurate causality representation is generated. FIG. 13C illustrates a table of such a proportionate allocation of shared effect between the price and quantity. The change in the causal element times the base value is illustrated at 1322. The shared effect is illustrated at 1324. Total effect may be determined by summing shared effect and base effect, as seen at 1326.

Figure 15:
FIG. 15 illustrates a table comparing different methods of handling interaction effect, in accordance with some embodiments.

To illustrate how finite difference can affect the eventual calculation of causality, FIG. 14 provides an example table 1400 showing the data used between two time periods for causality calculation, in accordance with some embodiments. This data is then utilized to calculate causality using a first biased approach, a complimentary (also biased) approach, and using the finite difference approach, as seen in the table 1500 of FIG. 15. The biased approach is seen emphasizing price and mix effects, whereas the complimentary methodology emphasized quantity and exchange rate effects. The finite difference technique, by allocating shared effects by percent, more accurately reflects true, unbiased causality.

VI. Causality Equations

Causality equations include component equations known as effects. Said effects include a price effect, a volume effect, a mix effect, an exchange effect, a cost effect, product mix versus customer mix, exchange rate for cost and revenue, and new and lost business effects as incorporated into price-volume-mix-exchange rate components. Additional effects exist, and may be included within the causality equation as needs dictate. For most business applications, however, the above list of effects is sufficient for rapid and accurate Revenue Causality Analysis 200. The said effects may be summed to provide for the change in revenue. The causality model may be broken down as total margin, total revenue and margin percent. Interaction effects may be unbiased using finite difference formulas.

The following notation is helpful in the understanding of the following equations:

Subscript—i: Product, where products are items with common UPC numbers, model numbers or SKU numbers.

Subscript—k: Currency

N: total number of products.

M: total number of currencies.

$p_{i1k}$: the price of product i in the reference time period (time period 1), in currency k.

$p_{i2k}$: the price of product i in the comparison time period (time period 2), in currency k.

$v_{i1k}$: the volume of product i sold in the reference time period (time period 1), in currency k.

$v_{i2k}$: the volume of product i sold in the comparison time period (time period 2), in currency k.

$e_{1k}$: the exchange rate in the reference time period (time period 1), in currency k. Assume the $e_{1k}$ for the base currency is always 1.

$e_{2k}$: the exchange rate in the reference time period (time period 2), in currency k. Assume the $e_{2k}$ for the base currency is always 1.

1. Change in Revenue

The change in Revenue may be given as part of the transaction data, or may be calculated from the price and volume data.

The change in revenue is given by:

$$\sum_{k=1}^{M} \sum_{i=1}^{N} \left( \frac{p_{i2k} v_{i2k}}{e_{2k}} \right) - \sum_{k=1}^{M} \sum_{i=1}^{N} \left( \frac{p_{i1k} v_{i1k}}{e_{1k}} \right) \qquad \text{Equation 1}$$

To calculate the change in revenue, the price of each product in the comparison time period at a certain currency ($p_{i2k}$)

is multiplied by the volume of the product sold in the comparison period in that currency ($v_{i2k}$), thus providing the revenue for each product in the comparison time period in that currency. All product revenues for the comparison time period in that currency are divided by the exchange rate at the comparison time period for that currency ($e_{2k}$), to produce relative product revenues for the comparison time period. The relative product revenues for the comparison time period are summed for each product, thus providing the total revenue for the comparison time period for a currency. The total revenue for the comparison time period for each currency is then summed across each currency to produce the total revenue for the comparison time period.

Then, the price of each product in the reference time period at a certain currency ($p_{i1k}$) is multiplied by the volume of the product in the reference period in that currency ($v_{i1k}$), thus providing the revenue for each product in the reference time period in that currency. All product revenues for the reference time period in that currency are divided by the exchange rate at the reference time period for that currency ($e_{1k}$), to produce relative product revenues for the reference time period. The relative product revenues for the reference time period are summed for each product, thus providing the total revenue for the reference time period for a currency. The total revenue for the reference time period for each currency is then summed across each currency to produce the total revenue for the reference time period.

The total revenue for the reference time period is subtracted from the total revenue for the comparison time period, thereby providing the change in revenue.

2. Price Effect

The price effect calculates the quantity of revenue change that is attributable to changes in pricing.

The price effect is given by:

$$\sum_{k=1}^{M}\sum_{i=1}^{N}\left(\left(\frac{p_{i2k}-p_{i1k}}{e_{1k}}\right)\cdot v_{i2k}\right) \qquad \text{Equation 2}$$

To calculate the price effect, the price of each product at the reference time period in a certain currency ($p_{i1k}$) is subtracted from the price of the same product at the comparison time period in the currency ($p_{i2k}$), thus providing the change in price for each product at the currency. The change in price for each product at the currency is divided by the exchange rate for the currency at the reference time period ($e_{1k}$), to produce the relative change in price for each product at that currency.

The relative change in price for each product at that currency is multiplied by the volume of the same product sold during the comparison time period at that currency ($v_{i2k}$). This provides the price effect per product at that currency.

The price effects for each product at that currency are summed across all products to provide the price effect at that currency. The price effect at that currency is summed across all currencies to produce the price effect.

3. Volume Effect

The volume effect calculates the quantity of revenue change that is attributable to changes in volumes sold.

The volume effect is given by:

$$\left(\sum_{k=1}^{M}\sum_{i=1}^{N}v_{i2k}-\sum_{k=1}^{M}\sum_{i=1}^{N}v_{i1k}\right)\cdot\frac{\sum_{k=1}^{M}\sum_{i=1}^{N}\left(\frac{p_{i1k}}{e_{1k}}v_{i1k}\right)}{\sum_{k=1}^{M}\sum_{i=1}^{N}v_{i1k}} \qquad \text{Equation 3}$$

To calculate the volume effect, the volumes of all products sold for the reference time period in a currency ($v_{i1k}$), are summed across the products, resulting in the total volume for the reference time period in a currency. Then, total volume for the reference time period in a currency is summed across all currencies to produce the total volume for the reference time period.

Likewise, the volumes of all products sold for the comparison time period in a currency ($v_{i2k}$), are summed across the products, resulting in the total volume for the comparison time period in a currency. Then, total volume for the comparison time period in a currency is summed across all currencies to produce the total volume for the comparison time period. The total volume for the comparison time period is subtracted by the total volume for the reference time period to determine the change in volume.

The total revenue for the reference time period is calculated. The price of each product in the reference time period at a certain currency ($p_{i1k}$) is multiplied by the volume of the product in the reference period in that currency ($v_{i1k}$), providing the revenue for each product in the reference time period in that currency. All product revenues for the reference time period in that currency are divided by the exchange rate at the reference time period for that currency ($e_{1k}$), to produce relative product revenues for the reference time period at that currency. The relative product revenues for the reference time period at that currency are summed for each product, thus providing the total revenue for the reference time period for that currency. The total revenue for the reference time period for each currency is then summed across each currency to produce the total revenue for the reference time period.

The total revenue for the reference time period is then divided by the total volume sales for the reference time period. Total revenue divided by total volume produces a value of the revenue per product sold in the reference time period. As stated above, the total volume sales of the reference time period is found by summing the volumes of all products sold for the reference time period in a currency ($v_{i1k}$), across the products, resulting in the total volume for the reference time period in a currency. Then, total volume for the reference time period in a currency is summed across all currencies to produce the total volume for the reference time period.

Lastly, the revenue per product sold in the reference time period is multiplied by the change in volume to compute the volume effect.

4. Mix Effect

The mix effect calculates the quantity of revenue change that is attributable to changes in the mix of products sold.

The mix effect is given by:

$$\sum_{k=1}^{M}\sum_{i=1}^{N}v_{i2k}\cdot\sum_{k=1}^{M}\sum_{i=1}^{N}\left(\frac{p_{i1k}}{e_{1k}}\left(\frac{v_{i2k}}{\sum_{k=1}^{M}\sum_{i=1}^{N}v_{i2k}}-\frac{v_{i1k}}{\sum_{k=1}^{M}\sum_{i=1}^{N}v_{i1k}}\right)\right) \qquad \text{Equation 4}$$

To calculate the mix effect, the volumes of all products sold for the comparison time period in a currency ($v_{i2k}$), are summed across the products, resulting in the total volume for the comparison time period in a currency. Then, total volume for the comparison time period in a currency is summed across all currencies to produce the total volume for the comparison time period.

Similarly, the volumes of all products sold for the reference time period in a currency ($v_{i1k}$), are summed across the products, resulting in the total volume for the reference time period in a currency. Then, total volume for the reference time period in a currency is summed across all currencies to produce the total volume for the reference time period.

Additionally, the volume of each product sold in the reference time period in a currency ($v_{i1k}$) is divided by the total volume for the reference time period, thus calculating the percent of sales volume for the product in the reference time period in the currency.

The volume of each product sold in the comparison time period in a currency ($v_{i2k}$) is divided by the total volume for the comparison time period, thus calculating the percent of sales volume for the product in the comparison time period in the currency.

The percent of sales volume for the product in the reference time period in the currency is then subtracted from the percent of sales volume for the product in the comparison time period in the currency, to give the change in percent of sales volume for the product in the currency.

The price of the product for the reference time period in the currency ($p_{i1k}$) is divided by the exchange rate at the reference time period for that currency ($e_{1k}$), to produce relative price of the product for the reference time in the currency.

The relative price of the product for the reference time in the currency is then multiplied by the change in percent of sales volume for the product in the currency, thus calculating the percent revenue change of the product in the currency. The The exchange effect is given by:

$$\sum_{k=1}^{M}\sum_{i=1}^{N}\left(\left(\frac{p_{i2k}}{e_{2k}}-\frac{p_{i2k}}{e_{1k}}\right)\cdot v_{i2k}\right)$$ Equation 5

To calculate exchange effect, the price of the product for the comparison time period in the currency ($p_{i2k}$) is divided by the exchange rate at the comparison time period for that currency ($e_{2k}$), to produce the relative price of the product for the comparison time in the currency.

The price of the product for the comparison time period in the currency ($p_{i2k}$) is divided by the exchange rate at the reference time period for that currency ($e_{1k}$), to produce the price of the product for the comparison time in the currency at the reference rate.

By subtracting the price of the product for the comparison time in the currency at the reference rate from the relative price of the product for the comparison time in the currency, a change in price for the product at the comparison time in a currency due to exchange rate difference is calculated.

The change in price for the product at the comparison time due to exchange rate difference is multiplied by the volume of sales of a product at the comparison time period at the currency ($v_{i2k}$) to calculate the change in revenue for the product at the comparison time in a currency due to exchange rate difference.

The change in revenue for the product at the comparison time in a currency due to exchange rate difference is summed across all products to calculate change in revenue at the comparison time in a currency due to exchange rate difference. The change in revenue at the comparison time in a currency due to exchange rate difference is summed across all currencies to calculate the exchange effect.

6. Combined Revenue Causality Equation

By combining the foregoing equations, a revenue causality equation may be derived. The revenue causality equation includes the sum of the effects, equal to the change in revenue. The revenue causality equation is shown below:

$$\overbrace{\sum_{k=1}^{M}\sum_{i=1}^{N}\left(\frac{p_{i2}v_{i2}}{e_{2k}}\right)-\sum_{k=1}^{M}\sum_{i=1}^{N}\left(\frac{p_{i1}v_{i1}}{e_{1k}}\right)}^{\text{Change in Revenue}}=\overbrace{\sum_{k=1}^{M}\sum_{i=1}^{N}\left(\left(\frac{p_{i2k}-p_{i1k}}{e_{1k}}\right)\cdot v_{i2k}\right)}^{\text{Price effect}}+\overbrace{\sum_{k=1}^{M}\sum_{i=1}^{N}\left(\left(\frac{p_{i2k}}{e_{2k}}-\frac{p_{i2k}}{e_{1k}}\right)\cdot v_{i2k}\right)}^{\text{Exchange effect}}$$ Equation 6

$$\underbrace{\left(\sum_{k=1}^{M}\sum_{i=1}^{N}v_{i2k}-\sum_{k=1}^{M}\sum_{i=1}^{N}v_{i1k}\right)\cdot\frac{\sum_{k=1}^{M}\sum_{i=1}^{N}\left(\frac{p_{i1k}}{e_{1k}}v_{i1k}\right)}{\sum_{k=1}^{M}\sum_{i=1}^{N}v_{i1k}}}_{\text{Volume effect}}+\underbrace{\sum_{k=1}^{M}\sum_{i=1}^{N}v_{i2k}\cdot\sum_{k=1}^{M}\sum_{i=1}^{N}\left(\frac{p_{i1k}}{e_{1k}}\left[\frac{v_{i2k}}{\sum_{k=1}^{M}\sum_{i=1}^{N}v_{i2k}}-\frac{v_{i1k}}{\sum_{k=1}^{M}\sum_{i=1}^{N}v_{i1k}}\right]\right)}_{\text{Mix effect}}$$

percent revenue change of the product in the currency is summed across all products, thus producing a total percent revenue change in the currency. The total percent revenue change in the currency is summed across all currencies, thus producing a total percent revenue change.

The total percent revenue change is multiplied by the total volume for the comparison period, thus giving the mix effect.

5. Exchange Effect

The exchange effect calculates the quantity of revenue change that is attributable to exchange rates.

In some embodiments, alternate effects may be included within the revenue causality equation. For example, cost effects, dividend gains, stock sales, inventory appreciation/depreciation, and theft/loss may be included as additional causal effects. It should be noted, as is well known to those skilled in the art, that with the inclusion of a cost effect the analysis becomes a marginal change causality analysis.

These alternate effects may in turn require additional transaction data. For example, in embodiments including cost effects, Transaction Data 105 may include cost data associated with each product. Alternatively, in some embodiments, the cost data may be estimated using industry standards. Moreover, in some embodiments, both real data may be included when available, and missing cost data may be estimated in the data preparation step 230. As such, the revenue causality equation is intended to be flexible enough to meet business needs, without placing any burden upon the business data collection practices.

Another example of the flexibility of the revenue causality equation includes a business which utilizes one currency, thus eliminating the need for exchange effects. By assuming that the exchange rate for the base currency is one ($e_{1k}=e_{2k}=1$) as stated above, the causality equation may be seen as reducing to a simpler form, as shown below:

$$\underbrace{\sum_{i=1}^{N}((p_{i2}-p_{i1})\cdot v_{i2})}_{\text{Price effect}} + \underbrace{\left(\sum_{i=1}^{N} v_{i2} - \sum_{i=1}^{N} v_{i1}\right) \cdot \frac{\sum_{i=1}^{N}(p_{i1}v_{i1})}{\sum_{i=1}^{N} v_{i1}}}_{\text{Volume effect}} + \underbrace{\sum_{i=1}^{N} v_{i2} \cdot \sum_{i=1}^{N}\left(p_{i1}\left(\frac{v_{i2}}{\sum_{i=1}^{N} v_{i2}} - \frac{v_{i1}}{\sum_{i=1}^{N} v_{i1}}\right)\right)}_{\text{Mix effect}} = \underbrace{\sum_{i=1}^{N}(p_{i2}v_{i2}) - \sum_{i=1}^{N}(p_{i1}v_{i1})}_{\text{Change in Revenue}} \quad \text{Equation 7}$$

7. Margin Percent Causation

In addition to finding a revenue and margin causality equation, it is desirable in some embodiments to generate a margin percentage causality equation. The margin percentage causality equation isolates contributors to changes in margin percentage between two time periods (months, quarters, half-years and years with any elapsed time between them). The earlier time period is the "base" and the later the "comparison" period.

The margin percentage causality equation incorporates a number of factors, in some embodiments, including: price change (in a common currency) for matched customer-material in each of two periods; change in average selling price in the common currency for materials sold in both periods but to different customers (note that, because the customers are not matched, this price change cannot be adjusted for foreign exchange rate changes); cost change (in a common currency) for matched customer-material in each of two periods, and for material matches in each of the periods without customer match; shifts in product (material) mix; shifts in customer (within product/material) for subset of customer-material matches; change in the prices quoted in local currency; respective contributions of price increases and price decreases to the net local currency price change; change in the selling foreign currency exchange rate with the common currency; change in the cost quoted in the local currency; change in mix among materials; impact of lost and new business (material transactions that exist in only one of the periods) between the periods as determined by the difference in margin for products sold in only one period, and net change in volume of products sold in only one of the periods; and the impact of any miscellaneous revenue adjustments included in the gross margin but not associated with the relevant quantities and costs.

For the margin percentage equation, let:
m=gross margin percent
t=time period, quarter (t=0 is the base period for change comparison)
i=product (material by customer), i=1, $n_t$
j=identifiers for analytical categories such as division, sales organization, product series Such that the gross margin percent is given by:

$$m_{tij} = \frac{p_{tij} - c_{tij}}{p_{tij}} \quad \text{Equation 8}$$

Where
p=average selling price for the specified identifiers in the common currency
c=standard cost per item for specified identifiers in the common currency For the margin percent at the enterprise level, let:
M=margin percent at the enterprise level (or other summary level)
R=Revenue at the enterprise level (or other summary level)
r=revenue for a specific cell (time, material by customer, identifiers)
q=quantity for a specific cell (time, material by customer, identifiers)
$c^T$=total costs for a specific transaction (time, material by customer, identifiers)—used only for the special cases of adjustments.

Such that the margin percent at the enterprise level is given by:

$$M_t = \frac{\sum_{i=1}^{n_t} q_{ti}p_{ti} - \sum_{i=1}^{n_t} q_{ti}c_{ti}}{\sum_{i=1}^{n_t} q_{ti}p_{ti}} \quad \text{Equation 9.1}$$

By pulling the numerator under one sum sign and multiplying both numerator and denominator by p and rearranging the terms, one gets:

$$M_t = \sum_{i=1}^{n_t} \frac{r_{ti}}{R_t} m_{ti} \quad \text{Equation 9.2}$$

The summary margin is a weighted average of the individual product margins weighted by percent of total revenue. Thus, the change in gross margin from the base period is:

$$\Delta M_t = \sum_{i=1}^{n_t} \frac{r_{ti}}{R_t} m_{ti} - \sum_{i=1}^{n_0} \frac{r_{0i}}{R_0} m_{0i} \quad \text{Equation 10.1}$$

The transaction database can contain transactions that do not generally contain all the elements of the original and represent adjustments of various kinds. They typically have zero revenue or zero quantity, or both. A few also have revenue and quantities with different signs. They consequent do not have a meaningful price or other measures and, hence, it is useful break them out separately.

The summations in the two terms are over five different domains, defined as follows:

X is the set of all material-customer combinations that exist in any time period.

S is the subset of same transactions—i.e. material-customer combinations with transactions in both the base and comparison periods.

B is the subset of N transactions that have a matching material code in L. Note that S has all transactions that match on both material and customer in both periods. So, B contains those observations for those material codes that exist in both periods, but are for different customers in each period.

$\overline{N}$ is the subset of transactions that exist in the comparison (t) period but have no transactions in the reference (t=0) period with the same material code.

$\overline{L}$ is the subset of transactions that exist in the reference (t=0) period but have no transactions in the comparison (t) period with the same material code.

$A_t$ is the subset of comparison ADJUSTMENT transactions in time t—i.e. transactions without associated quantities or revenues or quantities and revenues that imply negative prices, and hence are some inconsistent adjustment.

$A_0$ is the subset of base ADJUSTMENT transactions in time 0—i.e. transactions without associated quantities or revenues or revenues or quantities and revenues that imply negative prices, and hence are some inconsistent adjustment.

Using these domain definitions and the fact that margin cannot be defined for cases in the adjustment sets, the above equation may be rewritten as:

$$\Delta M_t = \sum_{i \in S} \frac{r_{ti}}{R_t} m_{ti} - \sum_{i \in S} \frac{r_{0i}}{R_0} m_{0i} + \sum_{i \in B} \frac{r_{ti}}{R_t} m_{ti} - \sum_{i \in B} \frac{r_{0i}}{R_0} m_{0i} + \sum_{i \in \overline{N}} \frac{r_{ti}}{R_t} m_{ti} - \sum_{i \in \overline{L}} \frac{r_{0i}}{R_0} m_{0i} + \sum_{i \in A_t} \frac{(r_{ti} - c_{ti}^T)}{R_t} - \sum_{i \in A_0} \frac{(r_{0i} - c_{0i}^T)}{R_0} \quad \text{Equation 10.2}$$

Note that there is no term for the set $\overline{N}$ in period t=0 because all the quantities are zero, hence, the term goes to zero. Similarly, there is no term for the set $\overline{L}$ in time period t, because all the quantities for lost business are zero.

Define that last two terms as follows:

$$\alpha_t = \sum_{i \in A_t} \frac{(r_{ti} - c_{ti}^T)}{R_t} = W_t - \kappa_t$$

$$\alpha_0 = \sum_{i \in A_0} \frac{(r_{0i} - c_{0i}^T)}{R_0} = W_0 - \kappa_0$$

Where ...

$$W_t = \sum_{i \in A_t} \frac{r_{ti}}{R_t}$$

$$\kappa_t = \sum_{i \in A_t} \frac{c_{ti}^T}{R_t}$$

$$\{AdjRevEffect\}_t = \alpha_t - \alpha_0$$

Note that breaking out of the W terms is strictly for computational convenience later. $W_t$ is the proportion of the total global revenue in time period t that comes from adjustments.

The first two terms are the impact of the same material numbers sold to the same customers in both time periods. The third and fourth terms are the effects of the same products sold in the two periods but to different sets of customers in each period. The fifth and sixth terms are the impact of gaining new business and losing old as defined above in terms of materials sold in the one period but not the other.

Let:

$$Z_t = \frac{\sum_{i \in S} q_{ti} p_{ti}}{\sum_{i \in X} q_{ti} p_{ti}}$$

$$V_t = \frac{\sum_{i \in B} q_{ti} p_{ti}}{\sum_{i \in X} q_{ti} p_{ti}}$$

Z is the proportion of the total that is the Same set (same material and customer).

V is the proportion of the total that is the Both set (same material, different customers).

$$\{NewMarginEffect\}_t = \quad \text{Equation 11}$$
$$(1 - V_t - Z_t - W_t) \sum_{i \in \overline{N}} \left[ \frac{r_{ti}}{\sum_{i \in \overline{N}} r_{ti}} (m_{ti} - M_t) \right]$$

$$\{LostMarginEffect\}_t = -(1 - V_0 - Z_0 - W_0) \quad \text{Equation 12}$$
$$\sum_{i \in \overline{L}} \left[ \frac{r_{0i}}{\sum_{i \in \overline{L}} r_{0i}} (m_{0i} - M_0) \right]$$

$$\{VolumeEffect\}_t = \quad \text{Equation 13}$$
$$(1 - V_t - Z_t - W_t) M_t - (1 - V_0 - Z_0 - W_0) M_0$$

Now $\Delta M'_t$ will be parsed, the change for products (material and customer) that remain the same between the two periods, into its components, starting with its definition above:

$$\Delta M'_t = Z_t \sum_{i \in S} \frac{r_{ti}}{\sum_{i \in S} q_{ti} p_{ti}} m_{ti} - Z_0 \sum_{i \in S} \frac{r_{0i}}{\sum_{i \in S} q_{0i} p_{0i}} m_{0i} \quad \text{Equation 14}$$

The expression may be split into three components, and the mix effect may be further divided:

$\Delta E^p$=The price component $\Delta E^c$=The cost component $\Delta E^m$=The mix component $\Delta E_t^{\tilde{m}}$=the between-product mix effect $\Delta E_t^{\tilde{m}c}$=the between customer within product mix effect=$\Delta E^m - \Delta E_t^{\tilde{m}}$ The formulas for each are as follows:

$$\Delta E_t^m = Z_t \frac{\sum_{i \in S} q_{ti}(p_{0i} - c_{0i})}{\sum_{i \in S} q_{ti} p_{0i}} - Z_0 M_{0S} \qquad \text{Equation 15}$$

Note that this expression captures the total mix effect—changes in the proportions of proportions of products sold and changes of the proportions among customers within product. The change in product proportions may be split out only as an additional piece of information by using the following modification:

$\Delta E_t^{\tilde{m}}$=The between—product mix effect only $\tilde{p}_{0k}$=The average selling price for product k in the base time 0

$\tilde{c}_{0k}$=The average production cost for product k in the base time 0

$\tilde{q}_{tk}$=The total quantity for product k in time t

K=The set of products $$\Delta E_t^{\tilde{m}} = Z_t \frac{\sum_{k \in K} \tilde{q}_{ti}(\tilde{p}_{0i} - \tilde{c}_{0i})}{\sum_{i \in S} q_{ti} p_{0i}} - Z_0 \frac{\sum_{k \in K} \tilde{q}_{0i}(\tilde{p}_{0i} - \tilde{c}_{0i})}{\sum_{i \in S} q_{0i} p_{0i}} \qquad \text{Equation 16}$$

The following are the formulas for the price and cost effects:

$$\Delta E_t^p = Z_t \left( \frac{\sum_{i \in S} q_{ti} c_{0i}}{\sum_{i \in S} q_{ti} p_{0i} \sum_{i \in S} q_{ti} p_{ti}} \right) \sum_{i \in S} q_{ti}(p_{ti} - p_{0i}) \qquad \text{Equation 17}$$

$$\Delta E_t^c = -Z_t \frac{\sum_{i \in S} q_{ti}(c_{ti} - c_{0i})}{\sum_{i \in S} q_{ti} p_{ti}} \qquad \text{Equation 18}$$

By definition:

{Priceeffect}$_t$=$\Delta E_t^p$

{CostEffect}$_t$=$\Delta E_t^c$

{MixEffect}$_t$=$\Delta E_t^m$

The set of transactions in the set B can be parsed in exactly the same way, except that the results relate to price, cost, and mix effects for the subset of transactions that have the same material in each time period but with different customers in each time period. Since these relate to the uncontrolled portion of the realized price effects, these will, for convenience, be referred to as the Realized Price, Realized Cost, and Realized Mix effects, or for short: RPrice, RCost, and RMix.

The "realized" effects are calculated in exactly the same way as the pure price change, except that the calculations are performed over set B rather than set S. The delta components are the same, but for clarity are noted with a prime, as follows:

$\Delta E'^p$=The average realized price component for unmatched customers $\Delta E'^c$=cost component for the average realized price for unmatched customers $\Delta E'^m$=mix component for average realized price for unmatched customers $$\Delta E_t'^m = V_t \frac{\sum_{i \in B} q_{ti}(p_{0i} - c_{0i})}{\sum_{i \in B} q_{ti} p_{0i}} - V_0 M_{0B} \qquad \text{Equation 19}$$

$$\Delta E_t'^p = V_t \left( \frac{\sum_{i \in B} q_{ti} c_{0i}}{\sum_{i \in B} q_{ti} p_{0i} \sum_{i \in B} q_{ti} p_{ti}} \right) \sum_{i \in B} q_{ti}(p_{ti} - p_{0i}) \qquad \text{Equation 20}$$

$$\Delta E_t'^c = -V_t \frac{\sum_{i \in B} q_{ti}(c_{ti} - c_{0i})}{\sum_{i \in B} q_{ti} p_{ti}} \qquad \text{Equation 21}$$

The effect of mix shift has, in theory, two components: (1) shifts of relative volume within a specific material among different customers and (2) shifts of relative volume among the different materials. For transactions that match on both customer and material, both components of mix are pulled out into the mix component. For the material-only matches, only the second element is extracted—namely shifts in proportions among materials. The realized price change includes any effects of shifts in customer proportions.

Next the price effect is disaggregated into: effect of changes in local price, and effect of changes in exchange rates to common currency. For this causality, let:

$p'_{ti}$=the selling price in the local sales currency $f_{ti}$=the foreign exchange rate in the common currency used for the i$^{th}$ product price Then:

$$p_{ti} = p'_{ti} f_{ti}$$

Which may be disaggregated as follows:

$$\Delta E_t^p = \Delta E_t^{p'} + \Delta E_t^f \qquad \text{Equation 22}$$

For ease of manipulation define:

$\Delta p'_i = p'_{ti} - p'_{0i}$ $\Delta f_i = f_{ti} - f_{0i}$

And, more generally, just for economy of expression:

$$|\Delta x_i| = \left| \frac{x_{ti} - x_{0i}}{x_{0i}} \right|$$

Then:

$$\Delta E_t^{p'} = Z_t \left( \frac{\sum_{i \in S} q_{ti} c_{0i}}{\sum_{i \in S} q_{ti} p_{0i} \sum_{i \in S} q_{ti} p_{ti}} \right) \qquad \text{Equation 23}$$

$$\sum_{i \in S} q_{ti} \left[ \Delta p'_i f_{0i} + \Delta p'_i \Delta f_i \left( \frac{|\Delta p'_i|}{|\Delta p'_i| + |\Delta f_i|} \right) \right]$$

$$\Delta E_t^f = Z_t \left( \frac{\sum_{i \in S} q_{ti} c_{0i}}{\sum_{i \in S} q_{ti} p_{0i} \sum_{i \in S} q_{ti} p_{ti}} \right)$$ Equation 24

$$\sum_{i \in S} q_{ti} \left[ \Delta f_i p'_{0i} + \Delta p'_i \Delta f_i \left( \frac{|\Delta f_i|}{|\Delta p'_i| + |\Delta f_i|} \right) \right]$$

$\{LocalPriceEffect\}_t = \Delta E_t^{p'}$
$\{ForExEffect\}_t = \Delta E_t^f$

For the "Both" data set in which the product, but not customer, matches across the periods, there is no direct actual foreign exchange rate that was used in the un-matched period. However, an estimate for that period may be made, using the average posted rate, hence the following; let:

$\bar{f}_t$ = average foreign exchange rate for period including t $\Delta \bar{f} = \bar{f}_t - f_0$ Or, depending on which period does not have the actual observation $\Delta \bar{f} = f_t - \bar{f}_0$ The results for the Both data set become:

$$\Delta E_t^{'p'} = V_t \left( \frac{\sum_{i \in B} q_{ti} c_{0i}}{\sum_{i \in B} q_{ti} p_{0i} \sum_{i \in B} q_{ti} p_{ti}} \right)$$ Equation 25

$$\sum_{i \in B} q_{ti} \left[ \Delta p'_i \bar{f}_{0i} + \Delta p'_i \Delta \bar{f}_i \left( \frac{|\Delta p'_i|}{|\Delta p'_i| + |\Delta \bar{f}_i|} \right) \right]$$

$$\Delta E_t^{'f} = V_t \left( \frac{\sum_{i \in B} q_{ti} c_{0i}}{\sum_{i \in B} q_{ti} p_{0i} \sum_{i \in B} q_{ti} p_{ti}} \right)$$ Equation 26

$$\sum_{i \in B} q_{ti} \left[ \Delta \bar{f}_i p'_{0i} + \Delta p'_i \Delta \bar{f}_i \left( \frac{|\Delta \bar{f}_i|}{|\Delta p'_i| + |\Delta \bar{f}_i|} \right) \right]$$

$\{RLocalPriceEffect\}_t = \Delta E'_t{}^{p'}$
$\{RForExEffect\}_t = \Delta E'_t{}^f$ So, now the decomposition is completed as follows:

$\Delta M_t = \{LocalPriceEffect\}_t + \{ForExEffect\}_t + \{CostEffect\}_t +$ Equation 27
$\{MixEffect\}_t + \{RLocalPriceEffect\}_t + \{RForExEffect\}_t +$
$\{RCostEffect\}_t + \{RMixEffect\}_t + \{LostMarginEffect\}_t +$
$\{NewMarginEffect\}_t + \{VolumeEffect\}_t + \{AdjRevEffect\}_t$ The {LocalPriceEffect} is the net impact of both price increases and price decreases. Sometimes it is of interest to decompose this net effect into the effect of those prices that increased across the period and the effect of those that declined. Similarly, the realized price changes for the measure same material to different customers, {RPriceEffect}, can be split into increases and decreases for realized prices for that set of transactions.

To divide the price effect, {S} and {B} each need to be split into two subsets as follows:

$S^+$ is the set of matched customer-materials in both periods for which the price rose between the two periods.

$S^-$ is the matched customer-materials in both periods for which the price declined between the two periods.

$B^+$ is the set of matched products-only in both periods for which the price rose between the two periods.

$B^-$ is the matched products-only in both periods for which the price declined between the two periods.

With these added definitions, the formulas may be written as follows:

$$\Delta E_t^{p'+} = Z_t \left( \frac{\sum_{i \in S} q_{ti} c_{0i}}{\sum_{i \in S} q_{ti} p_{0i} \sum_{i \in S} q_{ti} p_{ti}} \right)$$ Equation 28

$$\sum_{i \in S^+} q_{ti} \left[ \Delta p'_i f_{0i} + \Delta p'_i \Delta f_i \left( \frac{|\Delta p'_i|}{|\Delta p'_i| + |\Delta f_i|} \right) \right]$$

$$\Delta E_t^{p'-} = Z_t \left( \frac{\sum_{i \in S} q_{ti} c_{0i}}{\sum_{i \in S} q_{ti} p_{0i} \sum_{i \in S} q_{ti} p_{ti}} \right)$$

$$\sum_{i \in S^-} q_{ti} \left[ \Delta p'_i f_{0i} + \Delta p'_i \Delta f_i \left( \frac{|\Delta p'_i|}{|\Delta p'_i| + |\Delta f_i|} \right) \right]$$

$$\Delta E_t^{'p'+} = V_t \left( \frac{\sum_{i \in B} q_{ti} c_{0i}}{\sum_{i \in B} q_{ti} p_{0i} \sum_{i \in B} q_{ti} p_{ti}} \right)$$ Equation 29

$$\sum_{i \in B^+} q_{ti} \left[ \Delta p'_i \bar{f}_{0i} + \Delta p'_i \Delta \bar{f}_i \left( \frac{|\Delta p'_i|}{|\Delta p'_i| + |\Delta \bar{f}_i|} \right) \right]$$

$$\Delta E_t^{p'-} = V_t \left( \frac{\sum_{i \in B} q_{ti} c_{0i}}{\sum_{i \in B} q_{ti} p_{0i} \sum_{i \in B} q_{ti} p_{ti}} \right)$$

$$\sum_{i \in B^-} q_{ti} \left[ \Delta p'_i \bar{f}_{0i} + \Delta p'_i \Delta \bar{f}_i \left( \frac{|\Delta p'_i|}{|\Delta p'_i| + |\Delta \bar{f}_i|} \right) \right]$$

Impact of the change in the local manufacturing currency may be calculated into the common currency as follows:

$$\Delta E_t^{c'} = -Z_t \frac{\sum_{i \in S} q_{ti}}{\sum_{i \in S} q_{ti} p_{ti}} \left[ \Delta c'_i f'_{0i} + \Delta c'_i \Delta f_i \left( \frac{|\Delta c'_i|}{|\Delta c'_i| + |\Delta f'_i|} \right) \right]$$ Equation 30

$$\Delta E_t^{f'} = -Z_t \frac{\sum_{i \in S} q_{ti}}{\sum_{i \in S} q_{ti} p_{ti}} \left[ \Delta f'_i c'_{0i} + \Delta c'_i \Delta f'_i \left( \frac{|\Delta f'_i|}{|\Delta c'_i| + |\Delta f'_i|} \right) \right]$$ Equation 31

$\{LocalCostEffect\}_t = \Delta E_t^{c'}$
$\{ForExCostEffect\}_t = \Delta E_t^{f'}$ The costs for matched material numbers with unmatched customers can be similarly split:

$$\Delta E_t^{\prime c'} = -V_t \frac{\sum_{i\in B} q_{ti}}{\sum_{i\in B} q_{ti} p_{ti}} \left[ \Delta c_i' f_{0i}' + \Delta c_i' \Delta f_i' \left( \frac{|\Delta c_i'|}{|\Delta c_i'| + |\Delta f_i'|} \right) \right]$$
Equation 32

$$\Delta E_t^{\prime f'} = -V_t \frac{\sum_{i\in B} q_{ti}}{\sum_{i\in B} q_{ti} p_{ti}} \left[ \Delta f_i' c_{0i}' + \Delta c_i' \Delta f_i' \left( \frac{|\Delta f_i'|}{|\Delta c_i'| + |\Delta f_i'|} \right) \right]$$
Equation 33

$\{RLocalCostEffect\}_t = \Delta E_t^{\prime c'}$
$\{RForExCostEffect\}_t = \Delta E_t^{\prime f'}$ So, the decomposition has now been completed as follows:

$$\Delta M_t = \{LocalPriceIncrEffect\}_t +$$
Equation 34
$$\{LocalPriceDecrEffect\}_t + \{ForExEffect\}_t +$$
$$\{LocalCostEffect\}_t + \{ForExCostEffect\}_t +$$
$$\{MixEffect\}_t + \{RLocalPriceIncrEffect\}_t +$$
$$\{RLocalPriceDecrEffect\}_t + \{RForExEffect\}_t +$$
$$\{RLocalCostEffect\}_t + \{RForExCostEffect\}_t +$$
$$\{RMixEffect\}_t + \{LostMarginEffect\}_t +$$
$$\{NewMarginEffect\}_t + \{VolumeEffect\}_t + \{AdjRevEffect\}_t$$

8. Dollar Causation

Note that E with a triple prime (E''') is used for the revenue and cost effects measures other than margin and F triple prime (F''') for margin effects. Also note that the basic data elements are all defined the same in dollar causation as for margin percent causality.

The following are the price and quantity effects on revenue:

$$\Delta E_t^{\prime\prime\prime p} = \sum_{i\in S} \left\{ q_{0i} \Delta p_i + \Delta p_i \Delta q_i \left[ \frac{|\Delta p_i|}{|\Delta p_i| + |\Delta q_i|} \right] \right\}$$
Equation 35

$$\Delta E_t^{\prime\prime\prime q} = \sum_{i\in S} \left\{ p_{0i} \Delta q_i + \Delta p_i \Delta q_i \left[ \frac{|\Delta q_i|}{|\Delta p_i| + |\Delta q_i|} \right] \right\}$$

The quantity effect is parsed into volume and mix effects as follows:

$$\Delta E_t^{\prime\prime\prime V} = \sum_{i\in S} \left\{ p_{0i} \Delta q_i^V + \Delta p_i \Delta q_i^V \left[ \frac{|\Delta q_i|}{|\Delta p_i| + |\Delta q_i|} \right] \right\}$$
Equation 36

$$\Delta E_t^{\prime\prime\prime M} = \sum_{i\in S} \left\{ p_{0i} \Delta q_i^M + \Delta p_i \Delta q_i^M \left[ \frac{|\Delta q_i|}{|\Delta p_i| + |\Delta q_i|} \right] \right\}$$

The cost effect and the quantity effect on cost are as follows:

$$\Delta E_t^{\prime\prime\prime c} = \sum_{i\in S} \left\{ q_{0i} \Delta c_i + \Delta c_i \Delta q_i \left[ \frac{|\Delta c_i|}{|\Delta c_i| + |\Delta q_i|} \right] \right\}$$
Equation 37

$$\Delta E_t^{\prime\prime\prime q*} = \sum_{i\in S} \left\{ c_{0i} \Delta q_i + \Delta c_i \Delta q_i \left[ \frac{|\Delta q_i|}{|\Delta c_i| + |\Delta q_i|} \right] \right\}$$

Using the following definitions:

$$\Delta q_i^V = q_{0i} \left( \frac{\sum_{i\in S} \Delta q}{\sum_{i\in S} q_{0i}} \right)$$

$$\Delta q_i^M = q_{0i} \left( \frac{\Delta q_i}{q_{0i}} - \left( \frac{\sum_{i\in S} \Delta q}{\sum_{i\in S} q_{0i}} \right) \right)$$

The following for the Volume and Mix effects on Cost may be derived:

$$\Delta E_t^{\prime\prime\prime V*} = \sum_{i\in S} \left\{ c_{0i} \Delta q_i^V + \Delta c_i \Delta q_i^V \left[ \frac{|\Delta q_i|}{|\Delta c_i| + |\Delta q_i|} \right] \right\}$$
Equation 38

$$\Delta E_t^{\prime\prime\prime M*} = \sum_{i\in S} \left\{ c_{0i} \Delta q_i^M + \Delta c_i \Delta q_i^M \left[ \frac{|\Delta q_i|}{|\Delta c_i| + |\Delta q_i|} \right] \right\}$$

The following are definitions at the individual observation level:

$$\Delta e_i^{p'} = f_{0i} \Delta p_i' + \Delta p_i' \Delta f_i \left( \frac{|\Delta p_i'|}{|\Delta p_i'| + |\Delta f_i|} \right)$$
Equation 39

$$\Delta e_i^f = p_{0i}' \Delta f + \Delta p_i' \Delta f_i \left( \frac{|\Delta f_i|}{|\Delta p_i'| + |\Delta f_i|} \right)$$

The above definitions give the following results for overall local price and selling exchange rate effect:

$$\Delta E_t^{\prime\prime\prime p'} = \sum_{i\in S} \left\{ q_{0i} \Delta e_i^{p'} + \Delta q_i \Delta e_i^{p'} \left[ \frac{|\Delta p_i|}{|\Delta p_i| + |\Delta q_i|} \right] \right\}$$
Equation 40

$$\Delta E_t^{\prime\prime\prime f} = \sum_{i\in S} \left\{ q_{0i} \Delta e_i^f + \Delta q_i \Delta e_i^f \left[ \frac{|\Delta p_i|}{|\Delta p_i| + |\Delta q_i|} \right] \right\}$$

Similar results for the local-currency manufacturing cost and exchange rate are derived.

$$\Delta e_i^{c'} = f_{0i}^* \Delta c_i' + \Delta c_i' \Delta f_i^* \left( \frac{|\Delta c_i'|}{|\Delta c_i'| + |\Delta f_i^*|} \right)$$
Equation 41

$$\Delta e_i^{f*} = c_{0i}' \Delta f_i^* + \Delta c_i' \Delta f_i^* \left( \frac{|\Delta f_i^*|}{|\Delta c_i'| + |\Delta f_i^*|} \right)$$

$$\Delta E_t^{\prime\prime\prime c'} = \sum_{i\in S} \left\{ q_{0i} \Delta e_i^{c'} + \Delta q_i \Delta e_i^{c'} \left[ \frac{|\Delta c_i|}{|\Delta c_i| + |\Delta q_i|} \right] \right\}$$

$$\Delta E_t^{\prime\prime\prime f*} = \sum_{i\in S} \left\{ q_{0i} \Delta e_i^{f*} + \Delta q_i \Delta e_i^{f*} \left[ \frac{|\Delta c_i|}{|\Delta c_i| + |\Delta q_i|} \right] \right\}$$

The dollar margin effects are directly derivable from the revenue and cost effects:

$$\Delta F_t^{\prime\prime\prime p'} = \Delta E_t^{\prime\prime\prime p'}$$

$$\Delta F_t^{\prime\prime\prime c'} = -\Delta E_t^{\prime\prime\prime c'}$$

$$\Delta F_t^{\prime\prime\prime f} = \Delta E_t^{\prime\prime\prime f}$$

$$\Delta F_t^{\prime\prime\prime f*} = -\Delta E_t^{\prime\prime\prime f*}$$

$$\Delta F'''^q_t = \Delta E'''^q_t - \Delta E'''^{q*}_t$$

$$\Delta F'''^V_t = \Delta E'''^V_t - \Delta E'''^{V*}_t$$

$$\Delta F'''^M_t = \Delta E'''^M_t - \Delta E'''^{M*}_t \quad \text{Equation 42}$$

Lost and New Effects are:

$$\{LostRevenueEffect\}_t = \sum_{i \in L} r_{ti}$$

$$\{NewRevenueEffect\}_t = \sum_{i \in N} r_{ti}$$

$$\{LostCostffect\}_t = \sum_{i \in L} c_{ti}$$

$$\{NewCostEffect\}_t = \sum_{i \in N} c_{ti}$$

$$\{LostMarginEffect\}_t = \{LostRevenueEffect\}_t - \{LostCostffect\}_t$$

$$\{NewMarginEffect\}_t = \{NewRevenueEffect\}_t - \{NewCostEffect\}_t$$

9. Miscellaneous Considerations

In some embodiments, here is one further complication to address. Quantities, total cost, and revenue are flow measures that can be summed across time, so the quantity or revenue for a day, a month, a quarter, or a year may be calculated. Price, unit cost, and foreign exchange rates are point-in-time measures. For price, the average selling price across a period of time is used to measure price for the period. Similarly, costs in standard cost represent unit averages across the time period.

Foreign exchange, however, is applied to the enterprise accounts on a monthly basis. As a result, in order to create these estimates, the foreign exchange rate for the specific month in which the transaction occurred must be matched with each transaction or cost for that month. The dates for manufacturing costs foreign exchange rates are not adjusted for the implicit lags in manufacturing costs. In addition, the foreign exchange for the other period when customers do not match is an average for the period since there is no actual corresponding transaction.

Finally, each transaction may be tagged with any identifiers such as Product Division, Sales unit, etc. that might be of interest in diagnosing the origins of any variance of any of the effects components.

VII. Output

Figure 6:
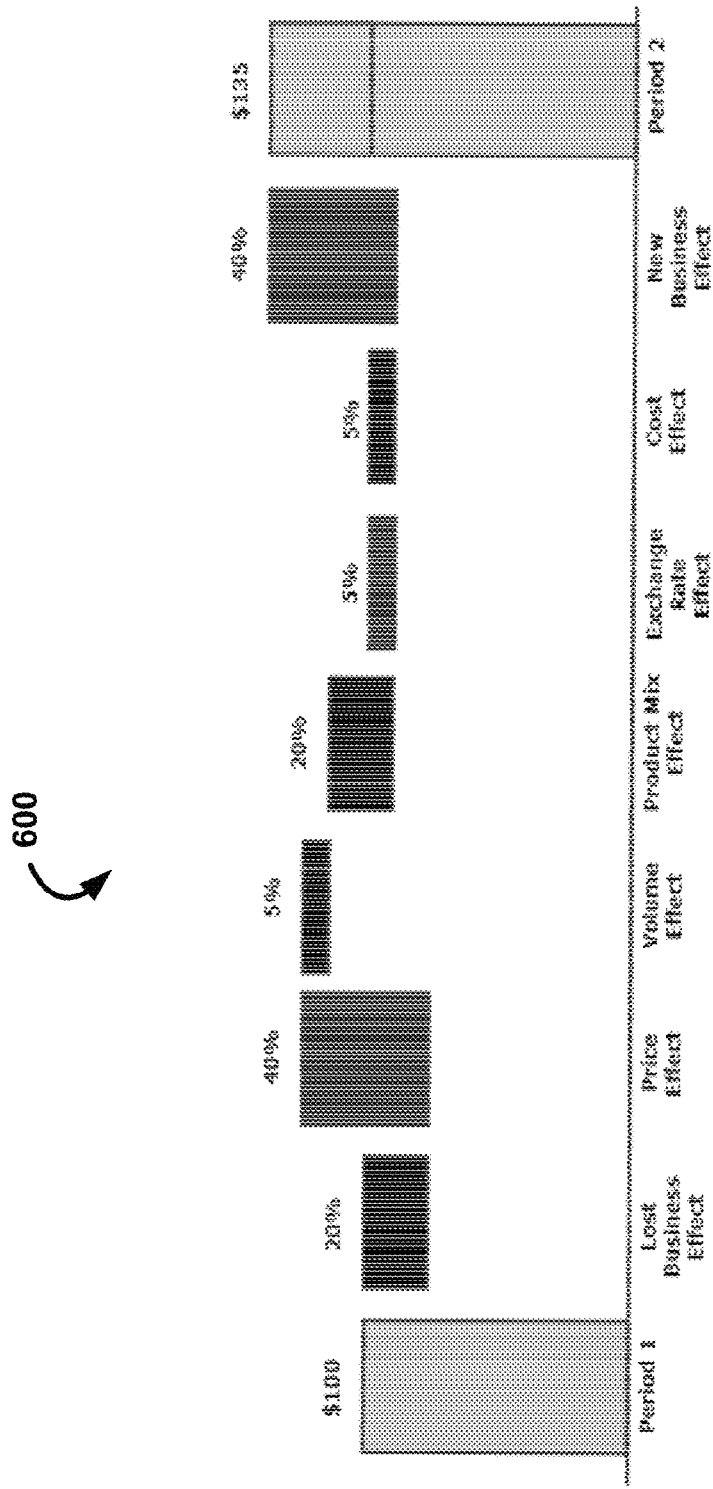
FIG. 6 shows a causality waterfall diagram for the revenue causality analyzer of FIG. 1.

An example of the output for the Causality Equation Application 240 may be seen as what is referred to as a causality waterfall. FIG. 6 shows an example of a causality waterfall diagram 600 derived from the analysis of revenue of causality for the exemplary data charts shown in FIGS. 4A and 4B. The causality waterfall diagram illustrates the increase in revenue from the reference time period to the comparison time period as being an increase of roughly 35%. The lost business effect, price effect, volume effect, mix effect, exchange rate effect, cost effect and new business effect are also shown. Lost business effect, volume effect, mix effect and cost effect are negative in this example; however, the price effect, exchange effect and new business effect are positive enough to offset the negative effects, and is accountable for a positive revenue change.

FIG. 7 shows an illustration of an exemplary output for the Revenue Causality Analyzer 100 when realistic Transaction Data 105 is utilized for product families. In this example the revenue for the reference time period and the comparison time period is shown, along with the change in revenue for each product family. The relevant price effect, volume effect and mix effect for each product family is also shown. In some embodiments, the user may be able to expand the product family categories. Product families may include individual products, product sub-groupings, or a combination. For example, within the product family labeled 'Wireless' there may exist a subgroup for wireless hardware and another subgroup for wireless management software. Each subgroup may include yet smaller subgroups, individual products, or a combination of both.

In some embodiments, the user may Interact 260 with the output by honing into individual subgroups. The Transaction Data 105 from the subgroups may then be analyzed by Applying the Causality Equation 240 to determine the causality effects of the individual subgroup. In this way, the user may develop a greater understanding of the causal effects on revenue for every level of the business. As such, a refined and detailed business plan may be implemented in order to most effectuate a business goal.

Figure 8:
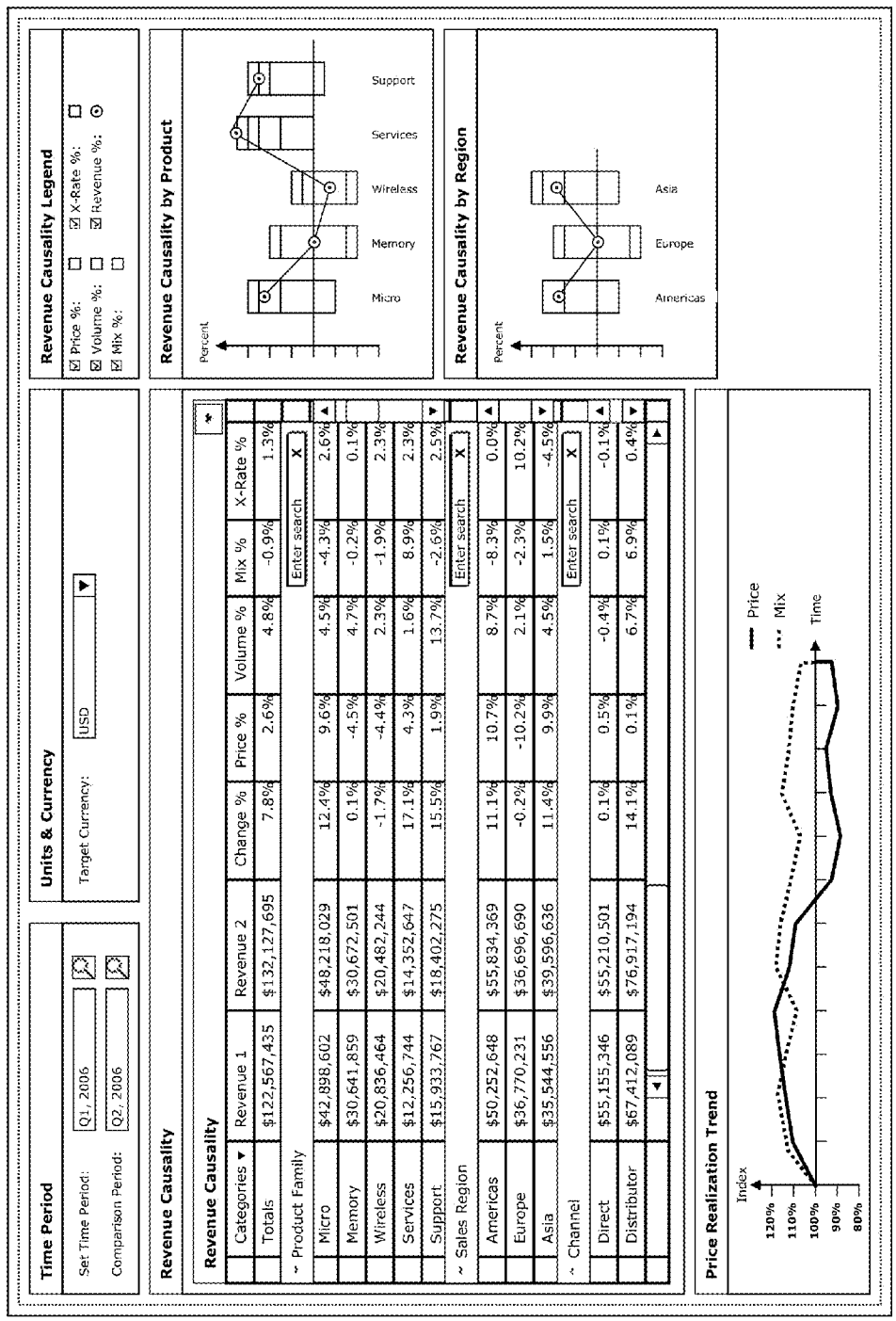
FIG. 8 shows an illustration of a user interface for the revenue causality analyzer of FIG. 1.

FIG. 8 shows an illustration of a user interface for the analysis of revenue causality. This interface illustrates the ability for the causality analyzer to be incorporated into a system for advanced effect analysis, including the tracking of effect trends and ease of user interaction across product families, sales regions and sales channel.

VIII. System

Figure 9A:
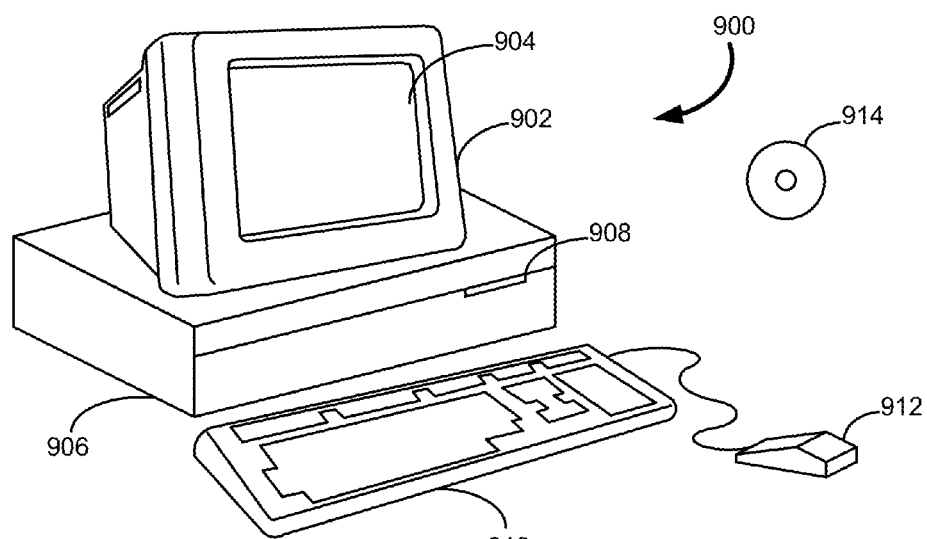
FIG. 9A illustrates a computer system, which forms part of a network and is suitable for implementing the revenue causality analyzer of FIG. 1.
Figure 9B:
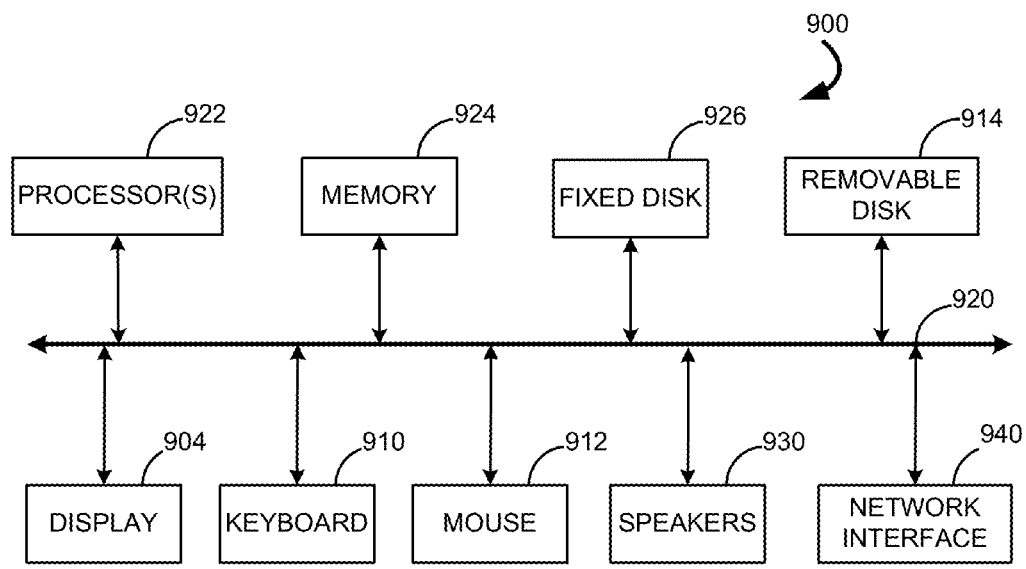
FIG. 9B illustrates a block diagram of a computer system and network suitable for implementing the revenue causality analyzer of FIG. 1.

FIGS. 9A and 9B illustrate a Computer System 900, which is suitable for implementing embodiments of the present invention. FIG. 9A shows one possible physical form of the Computer System 900. Of course, the Computer System 900 may have many physical forms ranging from a printed circuit board, an integrated circuit, and a small handheld device up to a huge super computer. Computer system 900 may include a Monitor 902, a Display 904, a Housing 906, a Disk Drive 908, a Keyboard 910, and a Mouse 912. Disk 914 is a computer-readable medium used to transfer data to and from Computer System 900.

FIG. 9B is an example of a block diagram for Computer System 900. Attached to System Bus 920 are a wide variety of subsystems. Processor(s) 922 (also referred to as central processing units, or CPUs) are coupled to storage devices, including Memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 926 may also be coupled bi-directionally to the Processor 922; it provides additional data storage capacity and may also include any of the computer-readable media described below. Fixed Disk 926 may be used to store programs, data, and the like and is typically a secondary storage medium (such as a hard disk) that is slower than primary storage. It will be appreciated that the information retained within Fixed Disk 926 may, in appropriate cases, be incorporated in standard fashion as virtual memory in Memory 924. Removable Disk 914 may take the form of any of the computer-readable media described below.

Processor 922 is also coupled to a variety of input/output devices, such as Display 904, Keyboard 910, Mouse 912 and Speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. Processor 922 optionally may be coupled to another computer or telecommunications network using Network Interface 940. With such a Network Interface 940, it is contemplated that the Processor 922 might receive information from the network, or might output information to the network in the course of performing the above-described Revenue Causality Analyzer 100. Furthermore, method embodiments of the present invention may execute solely upon Processor 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the present invention has been described in considerable detail with reference to exemplary embodiments, modifications and variations may be made to the disclosed embodiments while remaining within the subject and spirit of the invention. Therefore, the spirit and scope of the appended claims should not be limited to the description of the versions contained herein.

What is claimed is:

1. A causality analyzer implemented on a computer system, useful in association with price management systems, the causality analyzer comprising:
    a time period selector implemented on a computer system configurable to select a reference time period and a comparison time period;
    a causality modeler implemented on a computer system configurable to receive transaction data and calculate change in total margin, percent margin and total revenue between the reference time period and the comparison time period using the transaction data; and
    a causality attributor implemented on a computer system configurable to disaggregate each of the change in total margin, the percent margin and the total revenue by causality effects, wherein the causality effects include price effect, cost effect, quantity effect, product mix effect, customer mix effect, exchange rate effect, new and lost business, and an adjustment change, and further configurable to unbias the causality effects where they interact using a finite difference approach, wherein the finite difference approach splits the shared effect according to proportionate percentage of the change attributed only to each effect.

2. The causality analyzer as recited in claim 1, wherein the transaction data includes reference revenue and comparison revenue, wherein reference revenue is revenue at the reference time period and comparison revenue is revenue at the comparison time period, and wherein by subtracting the reference revenue from the comparison revenue the change in total revenue is calculated.

3. The causality analyzer as recited in claim 2, wherein the transaction data includes reference cost and comparison cost, wherein reference cost is cost at the reference time period and comparison cost is cost at the comparison time period, and wherein by subtracting reference cost from reference revenue a reference margin is calculated, and by subtracting comparison cost from comparison revenue a comparison margin is calculated, and wherein by subtracting reference margin from comparison margin the change in total margin is calculated, and wherein by dividing the reference margin by reference revenue a reference percent margin is calculated, and by dividing the comparison margin by comparison revenue a comparison percent margin is calculated, and by subtracting the reference percent margin from the comparison percent margin the change in percent margin is calculated.

4. The causality analyzer as recited in claim 3, wherein the total margin, the percent margin and the total revenue are each defined as a summation of the price effect, the cost effect, the quantity effect, the product mix effect, the customer mix effect, the exchange rate effect, the new and lost business, and the adjustment change.

5. The causality analyzer as recited in claim 1, further comprising at least one of a missing data exchanger and data error corrector.

6. The causality analyzer as recited in claim 5, wherein the missing data exchanger is configurable to identify missing data and to determine if the missing data is price data or volume data; and
    if the missing data is volume data, then replacing the missing volume data with a value of zero;
    if the missing data is exchange rate data, then replacing the missing exchange rate data with a weighted average used globally for currency and time period;
    if the missing data is cost data, then determining if the missing cost data is from the reference time period or the comparison time period; and
        if the missing cost data is from the reference time period, then replacing the missing cost data with cost data from the comparison time period; and
        else, if the missing cost data is from the comparison time period, then replacing the missing cost data with price data from the reference time period;
    else, if the missing data is price data, then determining if the missing price data is from the reference time period or the comparison time period; and
        if the missing price data is from the reference time period, then replacing the missing price data with price data from the comparison time period; and
        else, if the missing price data is from the comparison time period, then replacing the missing price data with price data from the reference time period.

7. The causality analyzer as recited in claim 3, wherein the transaction data includes at least one of an exchange rate at the reference time period, an exchange rate at the comparison time period, prices of the products at the reference time period in the currencies, prices of the products at the comparison time period in the currencies, volume of the products sold in the reference time period, volume of the products sold in the comparison time period, volume of each of the products sold in the reference time period in a currency, and volume of each of the products sold in the comparison time period in a currency.

8. The causality analyzer as recited in claim 7, wherein the price effect comprises:
- subtracting the prices of products at the reference time period in the currencies from the prices of the products at the comparison time period in the currencies to calculate a change in price for the products at the currencies;
- dividing the change in price for the products at the currencies by the exchange rate at the reference time period to calculate a relative change in price for the products at the currencies;
- multiplying the relative change in price for the products at the currencies by the volume of the products sold in the comparison time period to calculate price only effect;
- multiplying the relative change in price for the products at the currencies by the price to quantity split to calculate split price effect;
- combining the split price effect with price only effect to generate revenues for the products at the currencies;
- summing the revenues for the products at the currencies across the products to calculate revenues at the currencies; and
- summing the revenues at the currencies across the currencies.

9. The causality analyzer as recited in claim 7, wherein the volume effect comprises:
- multiplying the prices of the products at the reference time period in the currencies by the volume of the products sold in the reference time period to calculate revenue of the products for the reference time period in the currencies;
- dividing the revenue of the products for the reference time period in the currencies by the exchange rate at the reference time period to calculate relative revenue of the products for the reference time period in the currencies;
- summing the relative revenue of the products for the reference time period in the currencies across the products to calculate relative revenue for the reference time period in the currencies;
- summing the relative revenue for the reference time period in the currencies across the currencies to calculate relative revenue for the reference time period;
- dividing the relative revenue for the reference time period by the volume of the products sold in the reference time period to calculate revenue per product sold in the reference time period;
- subtracting the volume of the products sold in the reference time period by the volume of the products sold in the comparison time period to calculate change in volume;
- multiplying the change in volume by revenue per product sold in the reference time period to calculate the quantity only effect;
- multiplying the change in volume by the price to quantity split to calculate split quantity effect; and
- combining the split quantity effect with quantity only effect.

10. The causality analyzer as recited in claim 7, wherein the mix effect comprises:
- dividing the volume of each product sold in the reference time period in a currency by the volume of the products sold in the reference time period to calculate a percent of sales volume for the products in the reference time period;
- dividing the volume of each product sold in the comparison time period in a currency by the volume of the products sold in the comparison time period to calculate a percent of sales volume for the products in the comparison time period;
- subtracting the percent of sales volume for the products in the reference time period from the percent of sales volume for the products in the comparison time period to calculate a change in percent of sales volume for the products;
- dividing the price of the products in the reference time period in the currencies by the exchange rate at the reference time period to calculate a relative price of the products for the reference time in the currencies;
- multiplying the relative price of the products for the reference time in the currencies by the change in percent of sales volume for the products to calculate a percent revenue change of the products in the currencies;
- summing the percent revenue change of the products in the currencies across the products to calculate a percent revenue change in the currencies;
- summing the percent revenue change in the currencies across the currencies to calculate a percent revenue change; and
- multiplying the percent revenue change by the volume of products sold in the comparison time period.

11. The causality analyzer as recited in claim 7, wherein the exchange effect comprises:
- dividing the price of the products in the comparison time period in the currencies by the exchange rate at the comparison time period to calculate relative prices of the products at the comparison time periods in the currency;
- dividing the price of the products in the comparison time period in the currencies by the exchange rate at the reference time period to calculate prices of the products in the comparison time in the currencies at the exchange rate in the reference time period;
- subtracting the price of the product in the comparison time in the currencies at the exchange rate in the reference time period from the relative prices of the products at the comparison time in the currencies to calculate changes in price for the products at the comparison time in the currencies due to exchange rate difference;
- multiplying the changes in price for the products at the comparison time in the currencies due to exchange rate difference by the volume of sales of the products at the comparison time period to calculate changes in revenue for the products at the comparison time in the currencies due to exchange rate difference;
- summing changes in revenue for the products at the comparison time in the currencies due to exchange rate difference across the products to calculate changes in revenue at the comparison time in the currencies due to exchange rate difference; and
- summing changes in revenue at the comparison time in the currencies due to exchange rate difference across the currencies.

12. A method for analyzing causality, useful in association with price management systems, the method comprising:
- selecting, using a computer, time periods, wherein the selection of the time periods includes selecting a reference time period and a comparison time period;
- receiving, using a computer, transaction data, wherein transaction data includes pricing data and volume data about products;
- calculating, using a computer, change in total margin, percent margin and total revenue between the reference time period and the comparison time period using the transaction data;
- disaggregating, using a computer, each of the total margin, the percent margin and the total revenue by price effect, cost effect, quantity effect, product mix effect, customer mix effect, exchange rate effect, new and lost business, and an adjustment change;

unbiasing, using a computer, the causality effects where they interact using a finite difference approach, wherein the finite difference approach splits the shared effect according to proportionate percentage of the change attributed only to each effect; and outputting, using a computer, the disaggregated total margin, percent margin and total revenue.

13. The method, as recited in claim 12, wherein the transaction data includes reference revenue and comparison revenue, wherein reference revenue is revenue at the reference time period and comparison revenue is revenue at the comparison time period, and wherein by subtracting the reference revenue from the comparison revenue a change in revenue is calculated.

14. The method, as recited in claim 13, wherein the transaction data includes reference cost and comparison cost, wherein reference cost is cost at the reference time period and comparison cost is cost at the comparison time period, and wherein by subtracting reference cost from reference revenue a reference margin is calculated, and by subtracting comparison cost from comparison revenue a comparison margin is calculated, and wherein by subtracting reference margin from comparison margin the change in total margin is calculated, and wherein by dividing the reference margin by reference revenue a reference percent margin is calculated, and by dividing the comparison margin by comparison revenue a comparison percent margin is calculated, and by subtracting the reference percent margin from the comparison percent margin the change in percent margin is calculated.

15. The method, as recited in claim 14, wherein the total margin, the percent margin and the total revenue are each defined as a summation of the price effect, the cost effect, the quantity effect, the product mix effect, the customer mix effect, the exchange rate effect, the new and lost business, and the adjustment change.

16. The method, as recited in claim 12, wherein the preparation of the transaction data includes at least one of replacing missing data and correcting data errors.

17. The method, as recited in claim 16, wherein the replacement of the missing data comprises:

identifying missing data;

if the missing data is volume data, then replacing the missing volume data with a value of zero;

if the missing data is exchange rate data, then replacing the missing exchange rate data with a weighted average used globally for currency and time period;

if the missing data is cost data, then determining if the missing cost data is from the reference time period or the comparison time period; and if the missing cost data is from the reference time period, then replacing the missing cost data with cost data from the comparison time period; and else, if the missing cost data is from the comparison time period, then replacing the missing cost data with price data from the reference time period;

else, if the missing data is price data, then determining if the missing price data is from the reference time period or the comparison time period; and if the missing price data is from the reference time period, then replacing the missing price data with price data from the comparison time period; and else, if the missing price data is from the comparison time period, then replacing the missing price data with price data from the reference time period.

18. The method, as recited in claim 14, wherein the price effect comprises:

subtracting the prices of products at the reference time period in the currencies from the prices of the products at the comparison time period in the currencies to calculate a change in price for the products at the currencies;

dividing the change in price for the products at the currencies by the exchange rate at the reference time period to calculate a relative change in price for the products at the currencies;

multiplying the relative change in price for the products at the currencies by the volume of the products sold in the comparison time period to calculate price only effect;

multiplying the relative change in price for the products at the currencies by the price to quantity split to calculate split price effect;

combining the split price effect with price only effect to generate revenues for the products at the currencies;

summing the revenues for the products at the currencies across the products to calculate revenues at the currencies; and summing the revenues at the currencies across the currencies.

19. The method, as recited in claim 14, wherein the volume effect comprises:

multiplying the prices of the products at the reference time period in the currencies by the volume of the products sold in the reference time period to calculate revenue of the products for the reference time period in the currencies;

dividing the revenue of the products for the reference time period in the currencies by the exchange rate at the reference time period to calculate relative revenue of the products for the reference time period in the currencies;

summing the relative revenue of the products for the reference time period in the currencies across the products to calculate relative revenue for the reference time period in the currencies;

summing the relative revenue for the reference time period in the currencies across the currencies to calculate relative revenue for the reference time period;

dividing the relative revenue for the reference time period by the volume of the products sold in the reference time period to calculate revenue per product sold in the reference time period;

subtracting the volume of the products sold in the reference time period by the volume of the products sold in the comparison time period to calculate change in volume;

multiplying the change in volume by revenue per product sold in the reference time period to calculate the quantity only effect;

multiplying the change in volume by the price to quantity split to calculate split quantity effect; and combining the split quantity effect with quantity only effect.

* * * * *